(12) United States Patent
Morimura

(10) Patent No.: US 6,986,539 B2
(45) Date of Patent: Jan. 17, 2006

(54) FIXING MEMBER, CORD FIXING STRUCTURE, VEHICLE-MOUNTED APPARATUS, VEHICLE, AND METHOD OF FABRICATING FIXING MEMBER

(75) Inventor: Hitoshi Morimura, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/421,674

(22) Filed: Apr. 23, 2003

(65) Prior Publication Data

US 2004/0036306 A1 Feb. 26, 2004

(30) Foreign Application Priority Data

Apr. 24, 2002 (JP) .......................................... 2002-122099
Apr. 16, 2003 (JP) .......................................... 2003-111539

(51) Int. Cl.
*B62D 39/00* (2006.01)

(52) U.S. Cl. .................... 296/1.01; 296/1.07; 296/93; 296/146.5; 49/475.1

(58) Field of Classification Search ................ 296/1.01, 296/1.07, 93, 146.5; 49/475.1, 480.1, 483.1
See application file for complete search history.

(56) References Cited

U.S. PATENT DOCUMENTS

| | | | | | |
|---|---|---|---|---|---|
| 4,929,490 A | * | 5/1990 | Iwasa | ........................... | 296/93 |
| 5,261,718 A | * | 11/1993 | Ohlenforst et al. | ........... | 296/93 |
| 5,885,695 A | * | 3/1999 | Kittel et al. | ................ | 296/84.1 |
| 5,935,356 A | * | 8/1999 | Soldner | ........................ | 296/93 |
| 2004/0012220 A1 | * | 1/2004 | Huang | .......................... | 296/93 |
| 2004/0178661 A1 | * | 9/2004 | Filipczak et al. | .......... | 296/1.01 |

FOREIGN PATENT DOCUMENTS

| | | |
|---|---|---|
| JP | 5-56644 | 7/1993 |
| JP | 9-254694 | 9/1997 |
| JP | 11-5497 | 1/1999 |
| KR | 1991-10428 | 6/1991 |
| KR | 1996-33113 | 10/1996 |

OTHER PUBLICATIONS

Patent Abstract of Japan, Publication No. 09254694 A, Published on Sep. 30, 1997, in the name of Konishi Masaaki.
Patent Abstract of Japan, Publication No. 11005497 A, Published on Jan. 12, 1999, in the name of Sato Masao.
First Office Action for Korean patent Application No. 10-2003-25657, dated Mar. 21, 2005.

* cited by examiner

*Primary Examiner*—Lori L. Coletta
(74) *Attorney, Agent, or Firm*—Christie, Parker and Hale, LLP

(57) ABSTRACT

A fixing member (i.e., a connection cord fitting member), may be fixed to a counter-part member, such as a camera or an antenna, for retaining a fixed member, such as a connection cord. The fixing member includes a retention hole portion for retaining the fixed member, a cut portion or cutout portion for inserting the fixed member into the retention hole portion, and a clamp portion for clamping the counter-part member by resiliency. The fixing member can be used in a vehicle-mounted apparatus and a vehicle.

92 Claims, 20 Drawing Sheets

(a)

(b)

(a)

(b)

(a)

(c)         (b)         (d)

(a)

(c)  (b)  (d)

(a)

(c)    (b)    (d)

(a)

(c)　　　(b)　　　(d)

(a)

(c)　　　(b)　　　(d)

(a)

(c)　　　　　(b)　　　　　(d)

(a)

(c)　　　(b)　　　(d)

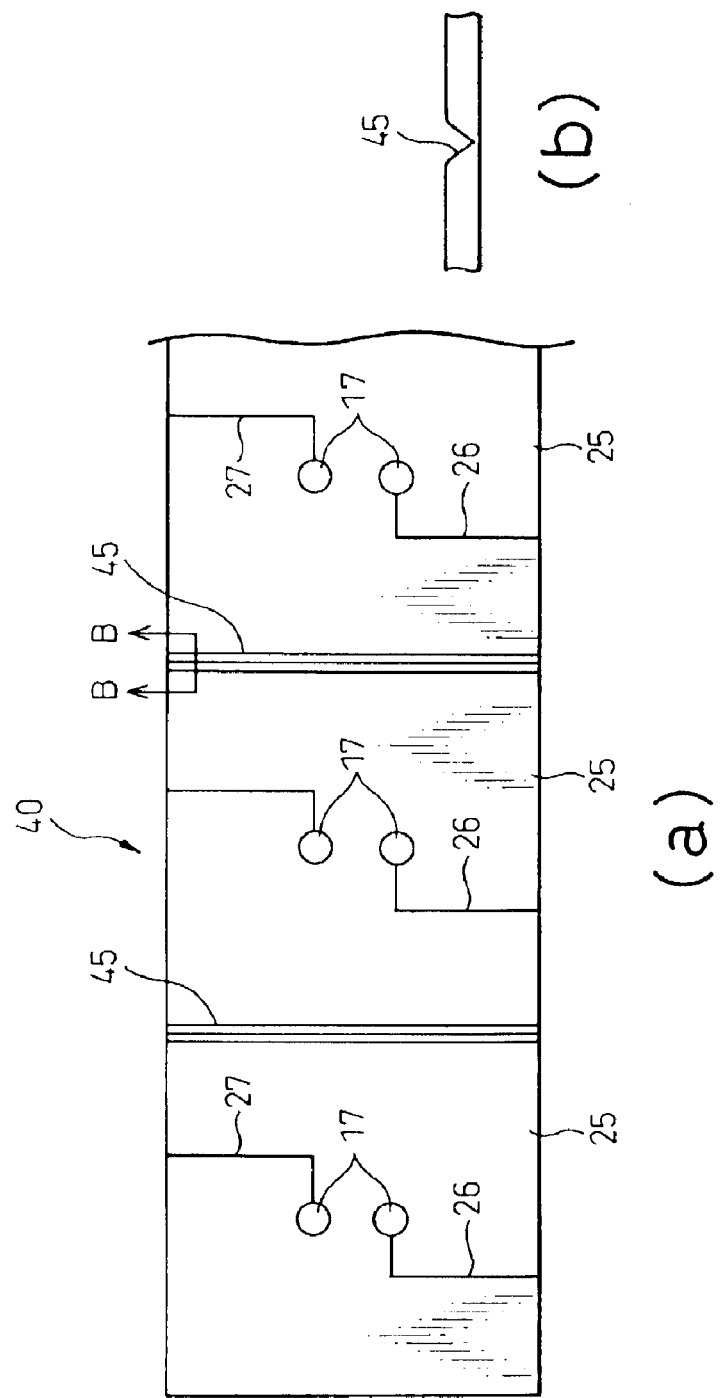

FIXING MEMBER, CORD FIXING STRUCTURE, VEHICLE-MOUNTED APPARATUS, VEHICLE, AND METHOD OF FABRICATING FIXING MEMBER

CROSS-REFERENCE TO RELATED APPLICATION

This application claims priority of Japanese Patent Application Number 2002-122099, filed Apr. 24, 2002 and Japanese Patent Application Number 2003-111539, filed Apr. 16, 2003.

BACKGROUND OF THE INVENTION

1. Field of the Invention

This invention relates to a fixing member that retains a fixed member, such as a cord, and can be fitted to and removed from a counter-part member (i.e., fitting member disposed on a counter-part side, to which the fixing member should be attached), such as a weather strip, by its own flexible force (i.e., resiliency), a cord fixing structure, a vehicle-mounted apparatus, a vehicle and a method of fabricating such a fixing member. Here, the term "weather strip" means a water-proofing elastic member that is fitted to a door opening portion at the side of a car main body, a trunk opening portion at the side of the car main body, a peripheral portion at the side of a car door, a lid portion of a trunk, etc., for preventing water, dust and sound from entering a vehicle (e.g., car).

2. Description of the Related Art

Various apparatuses are mounted to a vehicle (e.g., car). Among them, with regard to the apparatuses fitted outside the car, such as a camera or an antenna, connection cords are taken into the car to connect the apparatuses fitted outside the car to the apparatuses fitted inside the car. In this case, it is necessary to take water-proofing measures, and therefore, the following water-proofing means is employed. In order to make problems concerning a connection cord fitting member according to the prior art easily understood, a structure of the connection cord fitting member according to the prior art will be explained hereby with reference to FIGS. 1 and 2 that will be described in the laterappearing portion "BRIEF DESCRIPTION OF THE DRAWINGS".

A schematic view showing the connection cord fitting member according to the prior art, is illustrated in FIG. 1. In this drawings, portion (a) shows a front view and portion (b) shows a bottom view. A schematic view showing a wiring state using the connection cord fitting member according to the prior art, is illustrated in FIG. 2. In this drawing, portion (a) shows a front view and portion (b) shows a side view. However, an explanation will be made hereby in the case in which the connection cord fitting member (corresponding to a fixing member) is fitted to a weather strip (hereinafter referred to as "door weather strip") arranged around a door opening portion for a car door at the side of a car main body by way of example.

In the drawings, reference numeral 80 denotes a connection cord fitting member. The connection cord fitting member 80 is a fitting member for fitting a connection cord (also referred to as "cord" for short) 75 for connecting a camera mounted outside the car to an apparatus disposed inside a car room (neither the camera nor the apparatus is shown in the drawings) to a door weather strip 70 arranged around a door opening portion for a car door, as shown in FIG. 2.

The connection cord fitting member 80 is a rectangular sheet, the height of which gradually increases from each of the edge portions thereof towards the central portion thereof (the connection cord fitting member 80 looks like an isosceles triangle as viewed in the side view as in FIG. 2), as shown in FIG. 1. A cord retention hole 81 for retaining a connection cord 75 is formed in the proximity of an apex of the isoceles triangle, in the same direction as an edge of the apex of the isoceles triangle. A double-faced adhesive tape 77 is attached to the bottom surface 82 of the connection cord fitting member 80 so as to fix the connection cord fitting member 80 to the door weather strip 70. A cut portion 83 is formed by cutting an edge of the cord retention hole 81, and a slit is defined by the cut portion 83 (in the same direction as an edge of the apex of the isoceles triangle) between the cord retention hole 81 and the bottom surface 82 (inclusive of the double-faced adhesive tape 77) so as to pass through the connection cord 75. A flexible member, such as a synthetic rubber, is used as the material of the connection cord fitting member 80, and is fabricated by means of molding to provide the connection cord fitting member 80.

Further, a wiring process by using the connection cord fitting member 80 will be explained with reference to FIG. 2.

First, the bottom portion of the connection cord fitting member 80 is bent towards the apex (upward in portion (a) of FIG. 1) and the cut portion 83 functioning as an edge-cut portion of the cord retention hole 81 is expanded. A predetermined position of the connection cord 75 is fitted into the cord retention hole 81, through the cut portion 83 expanded as mentioned above. Next, a release liner of the double-faced adhesive tape 77 attached to the bottom of the connection cord fitting member 80 is peeled to expose the adhesive surface. The connection cord fitting member 80 that can be thus adhered to the door weather strip 70 is bonded and fixed to the predetermined position of the door weather strip 70 in such a manner that the connection cord 75 is arranged substantially at right angles with the door weather strip 70.

Incidentally, in the prior art example shown in FIGS. 1 and 2, the connection cord fitting member is fitted to the door weather strip disposed around the door opening portion for the car door at the side of the car main body. However, the connection cord fitting member can also be fitted to the weather strip disposed in some other portions (e.g., a trunk opening portion) at the side of the car main body, or disposed in a peripheral portion at the side of the car door, or disposed in a lid portion of a trunk. Further, in this example, the connection cord having a cylindrical sectional shape is fitted to the connection cord fitting member. However, it is also possible to fit a connection cord of an antenna or the like, having an elliptic or rectangular sectional shape, to the connection cord fitting member when the shape of the cord retention hole is appropriately changed in accordance with the shape of the connection cord.

Incidentally, the following related references (i.e., References 1 to 3) describe the example in which the connection cord fitting member is fitted to the weather strip disposed in the trunk opening portion at the side of the car main body, or disposed in the lid portion of the trunk.

Reference 1
Japanese Unexamined Patent Publication (Kokai) No. 5-56644
Reference 2
Japanese Unexamined Patent Publication (Kokai) No. 9-254694
Reference 3
Japanese Unexamined Patent Publication (Kokai) No. 11-5497

According to the fixing structure of the connection cord described above, however, the connection cord fitting member 80 is bonded to the door weather strip 70 through the double-faced adhesive tape 77, as shown in FIG. 2. Since the connection cord fitting member 80 is repeatedly pushed every time the door is opened and closed, an extension and contraction of the surface of the double-faced adhesive layer bonded to the door weather strip 80 occurs, and the double-faced adhesive tape 77 is peeled from the door weather strip 70. Consequently, the connection cord fitting member 80 falls off in some cases. When the connection cord fitting member 80 is bonded to the door weather strip 70 by using an adhesive bond or the like having higher bonding strength than the double-faced adhesive tape 77 to solve the above disadvantage, the connection cord fitting member 80 cannot be easily removed from the door weather strip 70 at the time of the mounting and removal of an apparatus, the exchange of the apparatus and the change of the arrangement of the apparatus.

SUMMARY OF THE INVENTION

In view of the problems described above, it is an object of the present invention to inexpensively provide a fixing member (or connection cord fitting member), which can be easily fitted to and removed from a counter-part member, such as a weather strip, and which can moreover retain reliably a fixed member, such as a connection cord, a cord fixing structure, a vehicle-mounted apparatus, a vehicle and a method of fabricating the fixing member.

According to a first aspect of the present invention for solving the problems, there is provided a fixing member, which is to be fixed to a counter-part member, for retaining a fixed member, comprising a retention hole portion for retaining the fixed member; a cut portion for inserting the fixed member into the retention hole portion; and a clamp portion for claming the counter-part member by means of resiliency, wherein the retention hole portion, the cut portion and the clamp portion are formed integratedly with each other.

According to a second aspect of the present invention, there is provided a fixing member, which is to be fixed to a counter-part member, for retaining a fixed member, comprising a retention hole portion for retaining the fixed member; a cutout portion having a width for inserting the fixed member into the retention hole portion; and a clamp portion for claming the counter-part member by means of resiliency, wherein the retention hole portion, the cutout portion and the clamp portion are formed integratedly with each other.

According to a third aspect of the present invention, there is provided a fixing member, which is to be fixed to a counter-part member, for retaining a fixed member, comprising a cutout portion having a taper portion into which the fixed member can be inserted; and a clamp portion for claming the counter-part member by means of resiliency, wherein the cutout portion and the clamp portion are formed integratedly with each other.

In the fixing member according to the first and second aspects of the present invention, the clamp portion preferably comprises a cylindrical body part formed by an elastic member into a cylindrical shape and an opening part formed so as to extend in a direction of an axis of the cylindrical body part, and at least two retention holes functioning as the retention hole portion are formed in the cylindrical body part in a direction crossing the axis.

In the fixing member according to the third aspect of the present invention, the clamp portion preferably comprises a cylindrical body part formed by an elastic member into a cylindrical shape and an opening part formed so as to extend in a direction of an axis of the cylindrical body part.

In the fixing member according to the first and second aspects of the present invention, the cut portion (or cutout portion) is preferably formed in such a manner as to extend from one side of the cylinder end surfaces of each of the retention holes in a direction of one cylinder end surface and then to connect to each end face of the opening part.

In the fixing member according to the first and second aspects of the present invention, the cut portion (or cutout portion) is preferably formed in such a manner that one of the two retention holes extends from one side of the cylinder end surfaces in a direction of one cylinder end surface and then connects to one end face of the opening part, and the remaining one of the two retention holes extends from the other side of the cylinder end surfaces of the remaining one of the retention holes in a direction of the other cylinder end surface and then connects to the other end face of the opening part.

In the fixing member according to the first and second aspects of the present invention, the cut portion (or cutout portion) is preferably formed in such a manner as to extend from one side of the cylinder end surfaces of each of the retention holes in a direction of one cylinder end surface, and the extending distal end portions in the cutout portion are then connected to each other.

In the fixing member according to the third aspect of the present invention, the cutout portion is preferably formed so that one side of the cutout portion extends in a direction of one cylinder end surfaces and then connects to each end face of the opening part.

In the fixing member according to the third aspect of the present invention, the cutout portion is preferably formed so that one side of the cutout portion extends in a direction of one cylinder end surface, and then connects to one end face of the opening part, and the other side of the cut portion extends in a direction of the other cylinder end surface, and then connects to the other end face of the opening part.

In the fixing member according to the third aspect of the present invention, the cutout portion is preferably formed in such a manner as to extend in a direction of one cylinder end surface, and the extending distal end portions in the cutout portion are connected to each other.

In the fixing member according to the first and second embodiments of the present invention, the fixing member preferably has a plurality of sets of retention holes functioning as the retention hole portion, and each of the plurality of sets of retention holes are provided with the cut portions (or cutout portions).

In the fixing member according to the third embodiment of the present invention, the fixing member preferably has a plurality of sets of cutout portions.

In the fixing member according to the first to third embodiments of the present invention, splitting means is preferably provided between adjacent ones of the plurality of sets of retention holes (or plurality of sets of cutout portions) to allow the splitting between the plurality of sets of retention holes (or plurality of sets of cutout portions) to be easily carried out.

In the fixing member according to the first to third embodiments of the present invention, concavo-convexity is preferably provided in an inner surface of the cylindrical body part.

In the fixing member according to the first to third embodiments of the present invention, concavo-convexity is preferably provided in each end face of the opening part.

In the fixing member according to the first to third embodiments of the present invention, adhesive means is preferably provided as auxiliary means in an inner surface of the cylindrical body part.

In the fixing member according to the first to third embodiments of the present invention, the fixed member is preferably a cord.

In the fixing member according to the first to third embodiments of the present invention, the fixed member is preferably a weather strip in a car door.

On the other hands, the present invention provides, as the first aspect, a cord fixing structure comprising a plurality of apparatuses; a cord for connecting the plurality of apparatuses; and a fixing member, which is to be fixed to a counter-part member, for fixing the cord. In such a cord fixing structure, the fixing member includes a retention hole portion for retaining the cord; a cut portion for inserting the cord into the retention hole portion; and a clamp portion for clamping the counter-part member by means of resiliency, wherein the retention hole portion, the cut portion and the clamp the portion are formed integratedly with each other.

As the second aspect, the present invention provides a cord fixing structure comprising a plurality of apparatuses; a cord for connecting the plurality of apparatuses; and a fixing member, which is to be fixed to a counter-part member, for fixing the cord. In such a cord fixing structure, the fixing member includes a retention hole portion for retaining the cord; a cutout portion having a width for inserting the cord into the retention hole portion; and a clamp portion for clamping the counter-part member by means of resiliency, wherein the retention hole portion, the cutout portion and the clamp portion are formed integratedly with each other.

As the third aspect, the present invention provides a cord fixing structure comprising a plurality of apparatuses; a cord for connecting the plurality of apparatuses; and a fixing member, which is to be fixed to a counter-part member, for fixing the cord. In such a cord fixing structure, the fixing member includes a cutout portion having a taper part into which the cord can be inserted; and a clamp portion for clamping the counter-part member by means of resiliency, wherein the cutout portion and the clamp portion are formed integratedly with each other.

As the fourth aspect, the present invention provides a cord fixing structure comprising one apparatus; a cord taken out from the apparatus; and a fixing member, which is to be fixed to a counter-part member, for retaining the cord. In such a cord fixing structure, the fixing member includes a retention hole portion for retaining the cord; a cut portion for inserting the cord into the retention hole portion; and a clamp portion for clamping the counter-part member by means of resiliency, wherein the retention hole portion, the cut portion and the clamp portion are formed integratedly with each other.

As the fifth aspect, the present invention provides a cord fixing structure comprising one apparatus; a cord taken out from the apparatus; and a fixing member, which is to be fixed to a counter-part member, for retaining the cord. In such a cord fixing structure, the fixing member includes a retention hole portion for retaining the cord; a cutout portion having a width for inserting the cord into the retention hole portion; and a clamp portion for clamping the counter-part member by means of resiliency, wherein the retention hole portion, the cutout portion and the clamp portion are formed integratedly with each other.

As the sixth aspect, the present invention provides a cord fixing structure comprising one apparatus; a cord taken out from the apparatus; and a fixing member, which is to be fixed to a counter-part member, for retaining the cord, wherein the fixing member includes a cutout portion having a taper part into which the cord can be inserted; and a clamp portion for clamping the counter-part member by resiliency, wherein the cutout portion and the clamp portion are formed integratedly with each other.

On the other hand, the present invention provides, as the first aspect, a vehicle-mounted apparatus comprising a first appliance fitted outside a car; a second apparatus fitted inside the car; a cord for connecting the first apparatus to the second apparatus; and a fixing member, which is to be fixed to a part of the car, for retaining the cord. In such a vehicle-mounted apparatus, the fixing member includes a retention hole portion for retaining the cord; a cut portion for inserting the cord into the retention hole portion; and a clamp portion for clamping the counter-part member by means of resiliency, wherein the retention hole portion, the cut portion and a clamp portion are formed integratedly with each other.

As the second aspect, the present invention provides a vehicle-mounted apparatus comprising a first apparatus fitted outside a car; a second apparatus fitted inside the car; a cord for connecting the first apparatus to the second apparatus; and a fixing member, which is to be fixed to a part of the car, for retaining the cord. In such a vehicle-mounted apparatus, the fixing member includes a retention hole portion for retaining the cord; a cutout portion having a width for inserting the cord into the retention hole portion; and a clamp portion for clamping the counter-part member by means of resiliency, wherein the retention hole portion, the cutout portion and the clamp portion are formed integratedly with each other.

As the third aspect, the present invention provides a vehicle-mounted apparatus comprising a first apparatus fitted outside a car; a second apparatus fitted inside the car; a cord for connecting the first apparatus to the second apparatus; and a fixing member, which is to be fixed to a part of the car, for retaining the cord. In such a vehicle-mounted apparatus, the fixing member includes a cutout portion having a taper part into which the cord can be inserted; and a clamp portion for clamping the counter-part member by means of resiliency, wherein the cutout portion and the clamp portion are formed integratedly with each other.

In the vehicle-mounted apparatus according to the first to third aspects of the present invention, the first apparatus described above is preferably an antenna.

On the other hand, the present invention provides, as the first aspect, a vehicle comprising a first apparatus fitted outside a car; a second apparatus fitted inside the car; a cord for connecting the first apparatus to the second apparatus; and a fixing member, which is to be fixed to a part of the car, for retaining the cord. In such a vehicle, the fixing member includes a retention hole portion for retaining the cord; a cut portion for inserting the cord; and a clamp portion for clamping the counter-part member by means of resiliency, wherein the retention hole portion, the cut portion and the clamp portion are formed integratedly with each other.

In the second aspect, the present invention provides a car comprising a first apparatus fitted outside a car; a second apparatus fitted inside the car; a cord for connecting the first apparatus to the second apparatus; and a fixing member, which is to be fixed to a part of the car, for retaining the cord. In such a vehicle, the fixing member includes a retention hole portion for retaining the cord; a cutout portion having a width for inserting the cord into the retaining hole portion;

and a clamp portion for clamping the counter-part member by means of resiliency, wherein the retention hole portion, the cutout portion and the clamp portion are formed integratedly with each other.

In the third aspect, the present invention provides a vehicle comprising a first apparatus fitted outside a car; a second apparatus fitted inside the car; a cord for connecting the first apparatus to the second apparatus; and a fixing member, which is to be fixed to a part of the car, for retaining the cord. In such a vehicle, the fixing member includes a cutout portion having a taper part into which the cord can be inserted; and a clamp portion for clamping the counter-part member by means of resiliency, wherein the cutout portion and the clamp portion are formed integratedly with each other.

In the vehicles according to the first to third embodiments of the present invention, the first apparatus is preferably an antenna.

On the other hand, the present invention provides, as the first aspect, a method of fabricating a fixing member, which is to be fixed to a counter-part member, for retaining a fixed member, comprising the step of forming integratedly with each other, a retention hole for retaining the fixed member, a cut portion for inserting the fixed member into the retention hole and a clamp portion for clamping the counter-part member by means of resiliency.

As the second aspect, the present invention provides a method of fabricating a fixing member, which is to be fixed to a counter-part member, for retaining a fixed member, comprising the step of forming integratedly with each other, a retention hole for retaining said fixed member, a cutout portion having a width for inserting the fixed member into the retention hole and a clamp portion for clamping the counter-part member by means of resiliency.

As the third aspect, the present invention provides a method of fabricating a fixing member, which is to be fixed to a counter-part member, for retaining a fixed member, comprising the step of forming integratedly with other, a cutout portion having a taper part into which the fixed member can be inserted and a clamp portion for clamping the counter-part member by means of resiliency.

As the fourth aspect, the present invention provides a method of fabricating a fixing member, which is to be fixed to a counter-part member, for retaining a fixed member, comprising the step of forming the fixing member consisting of a plurality of fixing units connected in series with each other, each of the fixing units including a retention hole for retaining the fixed member, a cut portion for inserting the fixed member into the retention hole and a clamp portion for clamping the counter-part member by means of resiliency, which are formed integratedly with each other.

As the fifth aspect, the present invention provides a method of fabricating a fixing member, which is to be fixed to a counter-part member, for retaining a fixed member, comprising the step of forming the fixing member consisting of a plurality of fixing units connected in series with each other, each of the fixing units including a retention hole for retaining the fixed member, a cutout portion having a width for inserting the fixed member into the retention hole and a clamp portion for clamping the counter-part member by means of resiliency, which are formed integratedly with each other.

As the sixth aspect, the present invention provides a method of fabricating a fixing member, which is to be fixed to a counter-part member, for retaining a fixed member, comprising the step of forming the fixing member consisting of a plurality of fixing units connected in series with each other, each of the fixing units including a cutout portion having a taper part into which can be inserted and a clamp portion for clamping the counter-part member by means of resiliency, which are formed integratedly with each other.

BRIEF DESCRIPTION OF THE DRAWINGS

The above object and features of the present invention will be more apparent from the following description of some preferred embodiments with reference to the accompanying drawings, wherein:

FIGS. 1a and 1b, is a schematic view showing a connection cord fitting member according to the prior art;

FIGS. 2a and 2b, is a schematic view showing a wiring state using the connection cord fitting member according to the prior art;

FIGS. 3a and 3b, is a schematic view showing a wiring state using a connection cord fitting member according to a typical preferred embodiment of the present invention;

FIGS. 5a, 5b, 5c, and 5d, is a schematic view (No. 1) showing a connection cord fitting member according to a first embodiment of the present invention;

FIGS. 7a, 7b, 7c, and 7d, is a schematic view (No. 1) showing a connection cord fitting member according to a first modified example of the first embodiment of the present invention;

FIGS. 8a, 8b, 8c, and 8d, is a schematic view showing a connection cord fitting member according to a second modified example of the first embodiment of the present invention;

FIGS. 9a, 9b, 9c, and 9d, is a schematic view (No. 1) showing a connection cord fitting member according to a second embodiment of the present invention;

FIGS. 11a, 11b, 11c, and 11d, is a schematic view (No. 1) showing a connection cord fitting member which is partly different from the second embodiment of the present invention;

FIGS. 13a, 13b, 13c, and 13d, is a schematic view (No. 1) showing another connection cord fitting member which is partly different from the second embodiment of the present invention;

FIGS. 15a, 15b, 15c, and 15d, is a schematic view (No. 1) showing a connection cord fitting member according to a third embodiment of the present invention;

FIGS. 17a, 17b, 17c, and 17d, is a schematic view (No. 1) showing a connection cord fitting member according to a fourth embodiment of the present invention;

FIGS. 19a, 19b, 19c, and 19d, is a schematic view (No. 1) showing connection portions each different from those of the connection cord fitting member according to the fourth embodiment of the present invention; and FIG. 20, including FIGS. 20a and 20b, is a schematic view (No. 2) showing connection portions each different from those of the connection cord fitting member according to the fourth embodiment of the present invention.

DESCRIPTION OF THE PREFERRED EMBODIMENTS

A typical preferred embodiment of the present invention will be explained with reference to FIGS. 3 and 4, and a first embodiment of the present invention will then be explained with reference to FIGS. 5 and 6.

Figure 1:
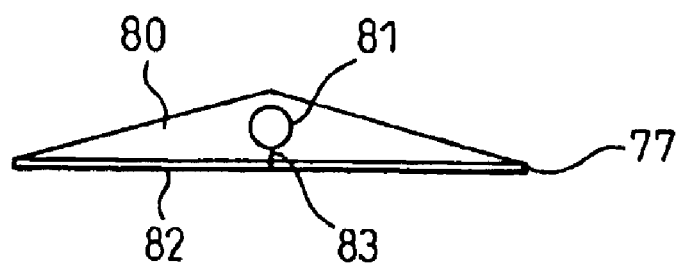
FIG. 1, including
Figure 1:
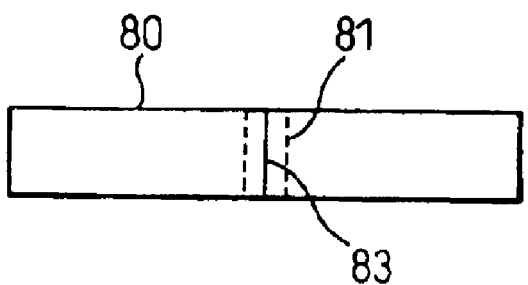
Figure 2:
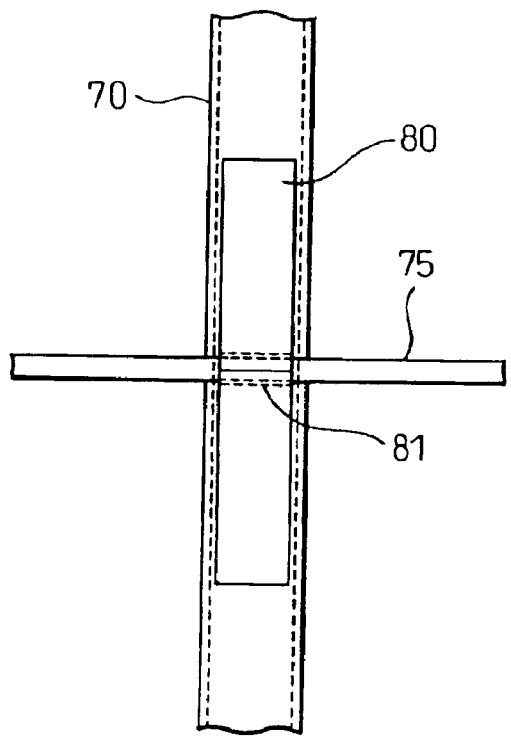
FIG. 2, including
Figure 2:
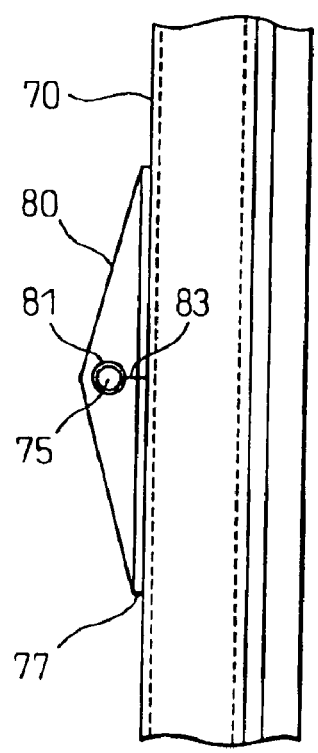
Figure 3:
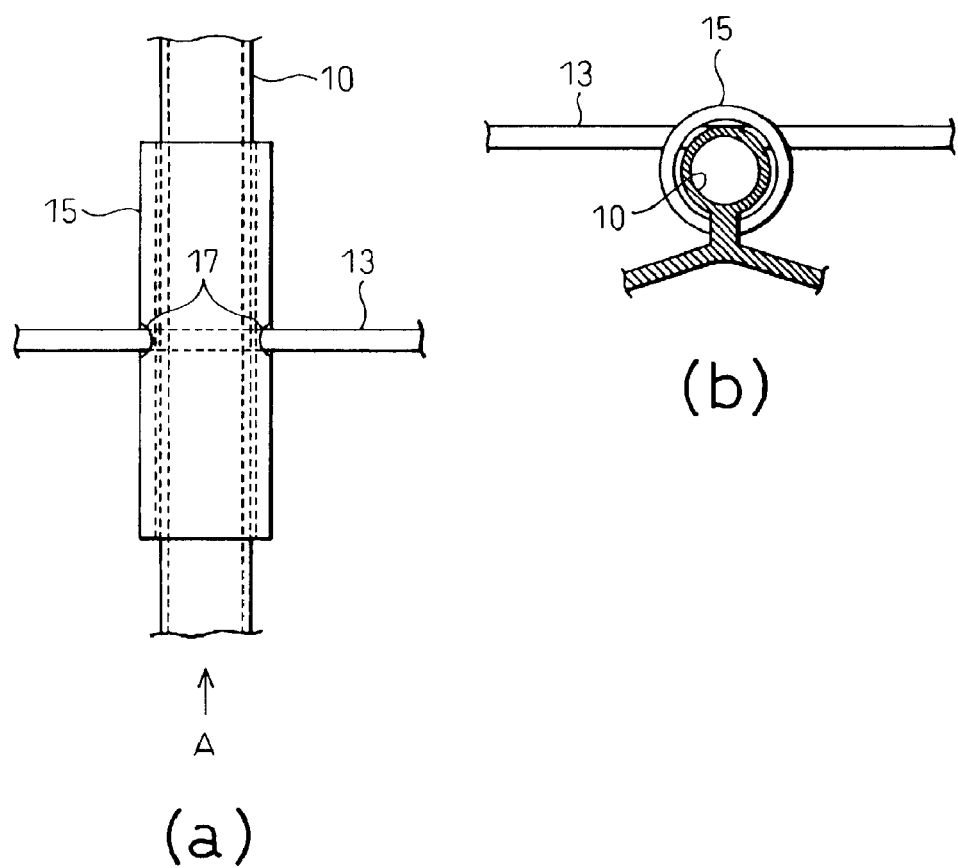
FIG. 3, including

FIG. 3 is a schematic view showing a wiring state using a connection cord fitting member according to a typical preferred embodiment of the present invention. In this drawing, portion (a) shows a front view and portion (b) shows a partially sectional view as viewed from a direction indicated by an arrow A. FIG. 4 is a perspective view showing a state in which the connection cord fitting member according to the typical preferred embodiment of the present invention is fixed.

Figure 5:
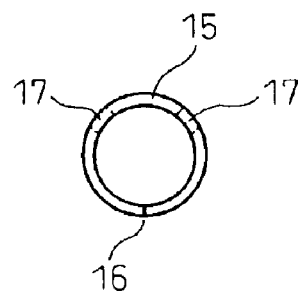
FIG. 5, including
Figure 5:
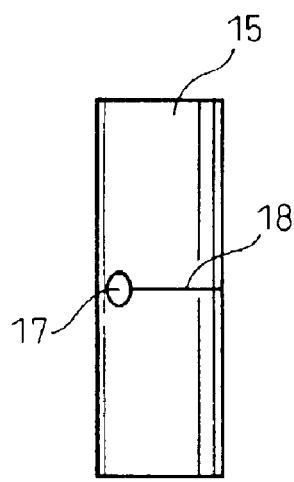
Figure 5:
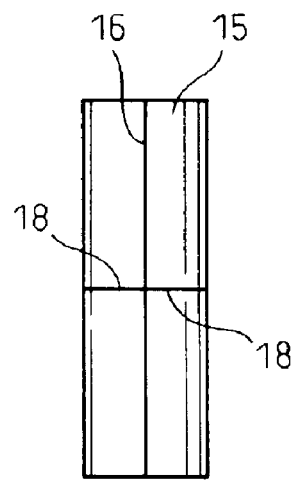
Figure 5:
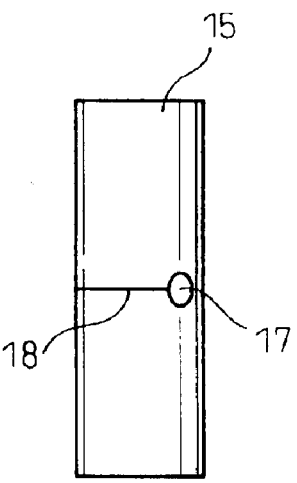

FIG. 5 is a schematic view (No. 1) showing a connection cord fitting member according to the first embodiment of the present invention. In this drawing, portion (a) shows a plan view, portion (b) shows a front view, portion (c) shows a left-hand side view, and portion (d) shows a right-hand side view. FIG. 6 is a schematic view (No. 2) showing the connection cord fitting member according to the first embodiment of the present invention and FIG. 6 shows a development.

Reference numeral 15 denotes a connection cord fitting member (corresponding to a fixing member). The connection cord fitting member 15 is a fitting member for fitting a connection cord 13 for connecting a camera or an antenna 5 disposed in a front portion 2 outside a car 1 to an apparatus disposed inside the car room (each not shown) to a door weather strip 10 (the door weather strip has a function of preventing water, dust, sound, etc., from entering the car, and generally, it has a shape and a section corresponding to the function by using an elastic rubber, a sponge rubber or the like).

Figure 4:
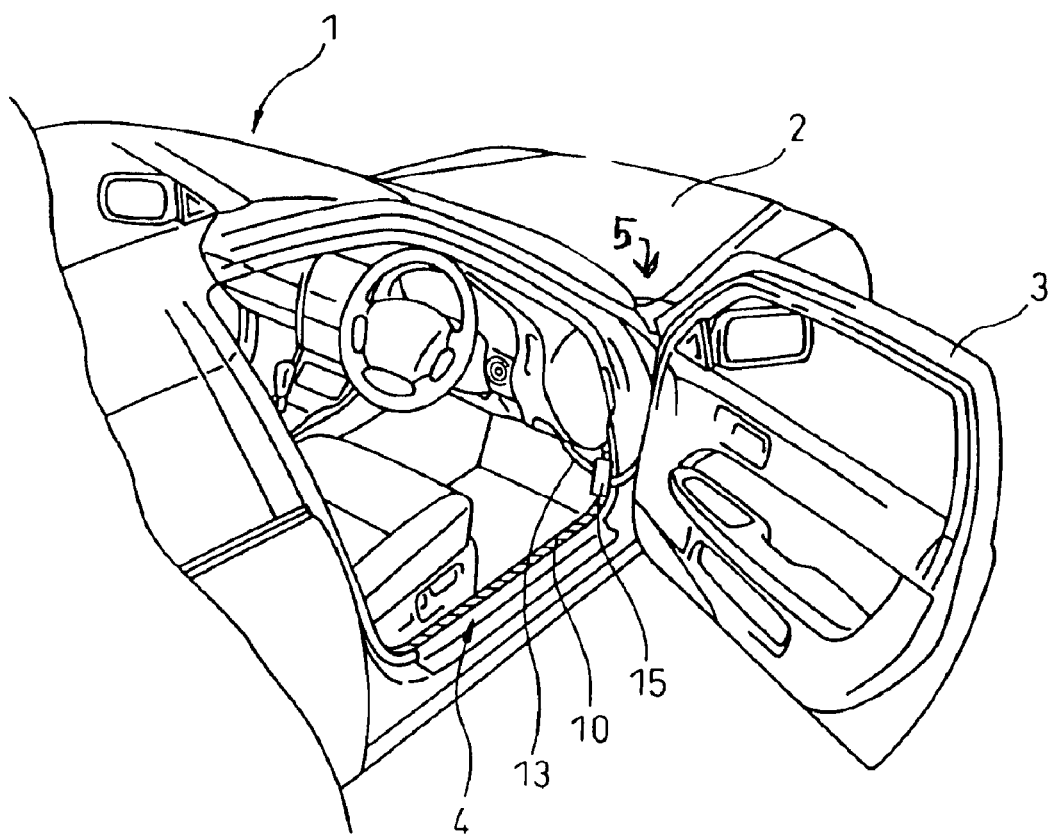
FIG. 4 is a schematic view showing a state in which the connection cord fitting member according to the typical preferred embodiment of the present invention is fixed.

The embodiment shown in FIGS. 3 and 4 represents the case in which the connection cord 13 is fitted to the door weather strip 10 formed by an elastic rubber, having a hollow circular (cylindrical) section and disposed around an opening portion 3 for a car door 4 at the side of the car main body. Incidentally, the connection cord fitting member according to the present invention can also be fitted to the weather strip disposed in some other portions (e.g., a trunk opening portion) at the side of the car main body, or disposed in a peripheral portion at the side of the car door or disposed in the lid portion of the trunk. The embodiment shown in FIGS. 3 and 4 represents the example in which the connection cord having a cylindrical sectional shape is fitted to the connection cord fitting member. However, a connection cord having an elliptic or square sectional shape, such as a standard connection cord of an antenna, can be fitted to the connection cord fitting member when the shape of a cord retention hole is appropriately changed in accordance with the shape of the connection cord.

Figure 6:
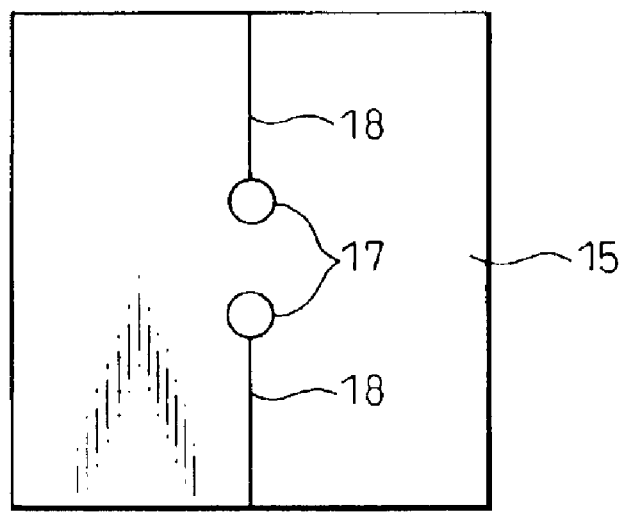
FIG. 6 is a schematic view (No. 2) showing the connection cord fitting member according to the first embodiment of the present invention.

The connection cord fitting member 15 according to the first embodiment of the present invention has a cylindrical shape as shown in FIGS. 5 and 6, and an opening part (or an opening portion) 16 is formed in an axial direction by cutting an edge of the cylinder (corresponding to a cylindrical body part). Cord retention holes 17 are formed at two positions of a substantial central portion of the cylinder in the longitudinal direction at the side opposing the opening part 16 and in a direction crossing the cylinder. In this embodiment (similarly in the below-mentioned embodiments), the cord retention holes 17 are formed in the direction crossing the cylinder at right angles. However, these retention holes 17 need not always cross the cylinder (in the longitudinal direction) at right angles. In this case, a pair of cut portions 18 (i.e., edge-cutting portions) are formed, respectively, between the cord retention holes 17 and the end face of the opening part 16, so as to allow the connection cord 13 to pass through the two cord retention holes 17. The shape of an inner diametric portion of the cylinder of the connection cord fitting member 15 has substantially the same as that of an outer diametric portion of the door weather strip 10. In other words, the size of the inner diametric portion of the connection cord fitting member 15 is equal to or a little smaller than the size of the outer diametric portion of the door weather strip 10. In consequence, a clamp force of the connection cord fitting member 15 can increase when the connection cord fitting member 15 is fitted to the door weather strip 10. The connection cord fitting member 15 is formed by means of molding from a rigid rubber (e.g., CR rubber).

When the connection cord fitting member 15 described above is fabricated, the cord retention holes 17, the cut portions 18 for inserting the connection cord 13 into the cord retention holes 17 and a clamp portion for clamping the door weather strip 10 by means of resiliency are integratedly molded. Alternatively, when the connection cord fitting member 15 is fabricated, it is possible to produce the connection cord fitting member 15 consisting of a series of a plurality of connection cord fitting units (or plurality of fixing units) in each of which the cord retention holes 17, the cut portions 18 for inserting the connection cord 13 into the cord retention holes 17 and the clamp portion for clamping the door weather strip 10 by means of resiliency are integratedly molded.

Further, a wiring process by using the connection cord fitting member will be explained.

First, the connection cord 13 is inserted through the cut portions 18 of the connection cord fitting member 15 and is fitted into the two cord retention holes 17. Both end portions of the connection cord fitting member 15 are gripped and bent towards the cord retention holes 17 (upward in the drawings), the portion near the cord retention holes 17 being the supporting point to expand the mouth of each of the cut portions 18. The connection cord 13 passes through the cut portions 18 and is inserted into the two cord retention holes 17. The connection cord fitting member 15 is then returned to the original state to retain the connection cord 13. Next, the mouth of the opening part 16 of the connection cord fitting member 15 is expanded outward. The connection cord fitting member 15 is then fitted to the predetermined position of the door weather strip 10 and clamps the door weather strip 10 by means of resiliency acting in the center direction of the connection cord fitting member 15.

As explained above, the connection cord fitting member 15 according to the first embodiment of the present invention can be fixed to a desired position of the door weather strip 10 by means of resiliency of the connection cord fitting member 15 holding the connection cord 13. Because the connection cord fitting member 15 brings the connection cord 13 into contact tightly with the door weather strip 10, it is possible to prevent rainwater falling toward the car from entering the car along the connection cord 13. Because the connection cord 13 is not fixed to the door weather strip 10 by using an adhesive, a double-faced adhesive tape or the like, the connection cord 13 and the connection cord fitting member 15 can be easily removed from the door weather strip 10. Therefore, the exchange of an apparatus, the recombination of the apparatus, or the change of the arrangement of the apparatus can be easily carried out.

Figure 7:
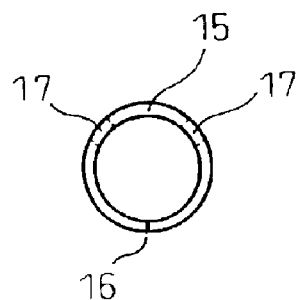
FIG. 7, including
Figure 7:
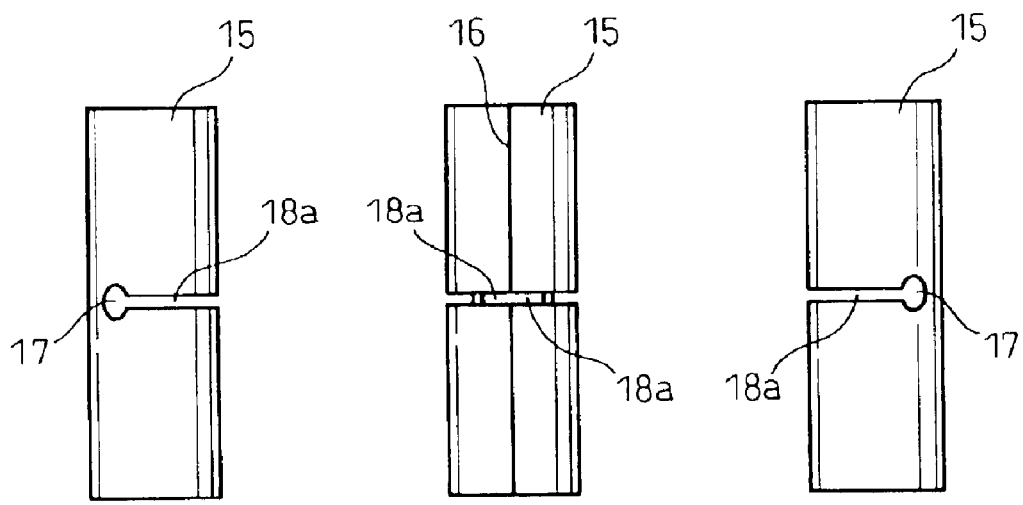

FIG. 7 is a schematic view showing a connection cord fitting member of a first modified example of the first embodiment of the present invention. In this drawing, portion (a) shows a plan view, portion (b) shows a front view, portion (c) shows a left-hand side view, and portion (d) shows a right-hand side view. Incidentally, the same reference numerals will be hereinafter used to identify the same constituent elements as explained above.

The structure of the connection cord fitting member 15 shown in FIG. 7 is substantially the same as the structure of the connection cord fitting member 15 shown in FIG. 5 but is different from the latter structure in that a pair of cutout portions 18a for allowing the connection cord 13 to be inserted into the two cord retention holes 17 has a relating large width. In this structure, the connection cord 13 can be inserted relatively easily into the cord retention holes 17 through the cutout portions 18a.

When the connection cord fitting member 15 described above in FIG. 7 is fabricated, the cord retention holes 17, the cutout portions 18a having the width for inserting the connection cord 13 into the cord retention holes 17 and the clamp portion for clamping the door weather strip 10 by means of resiliency are integratedly molded. Alternatively, when the connection cord fitting member 15 is fabricated, it is possible to produce the connection cord fitting member 15 consisting of a series of a plurality of connection cord fitting units (or plurality of fixing units) in each of which the cord retention holes 17, the cutout portions 18a having the width for inserting the connection cord 13 into the cord retention holes 17 and the clamp portion for clamping the door weather strip 10 by means of resiliency are integratedly molded.

Figure 8:
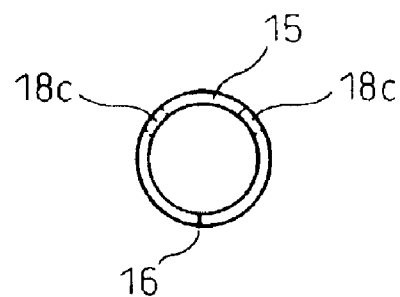
FIG. 8, including
Figure 8:
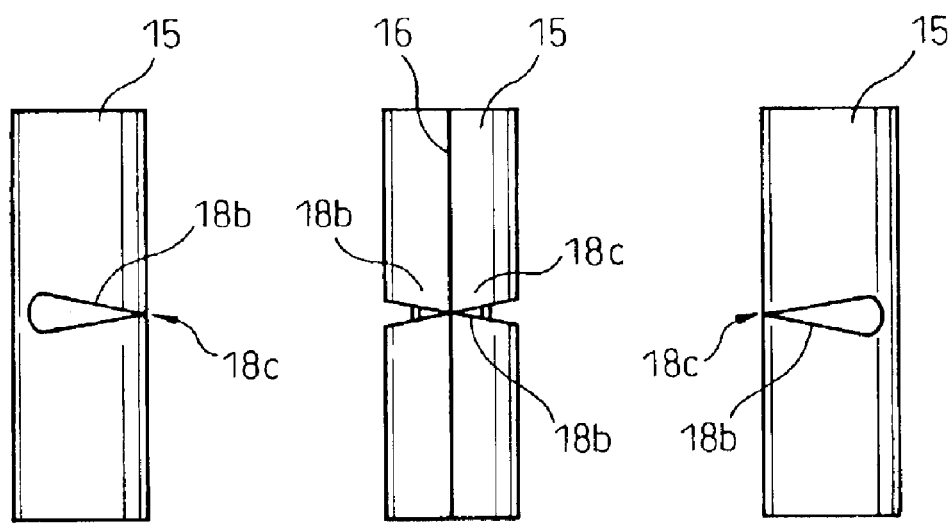

FIG. 8 is a schematic view showing a connection cord fitting member of a second modified example of the first embodiment of the present invention. In this drawing, portion (a) shows a plan view, portion (b) shows a front view, portion (c) shows a left-hand side view, and portion (d) shows a right-hand side view.

The structure of the connection cord fitting member 15 shown in FIG. 8 is substantially the same as the structure of the connection cord fitting member 15 shown in FIG. 5 but is different from the latter structure in that a pair of cutout portions 18c having a taper part 18b is formed on the connection cord fitting member 15 instead of the cord retention holes 17 and the cut portions 18 shown in FIG. 5. In this structure, the connection cord 13 having an arbitrary shape other than the cylinder can be inserted relatively easily into the cutout portions 18c.

When the connection cord fitting member 15 described above in FIG. 8 is fabricated, the cutout portions 18c having the taper part 18b for inserting the connection cord 13 and the clamp portion for clamping a counter-part member by means of resiliency are integratedly molded. Alternatively, when the connection cord fitting member 15 is fabricated, it is possible to produce the connection cord fitting member 15 consisting of a series of a plurality of connection cord fitting units (or plurality of fixing units) in each of which the cutout portions 18c having the taper part 18b for inserting the connection cord 13 and the clamp portion for clamping the door weather strip 10 by means of resiliency are integratedly molded.

Further, the second embodiment of the present invention will be explained with reference to FIGS. 9 to 14.

Figure 9:
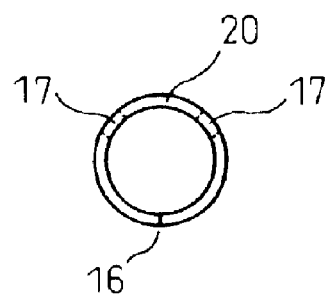
FIG. 9, including
Figure 9:
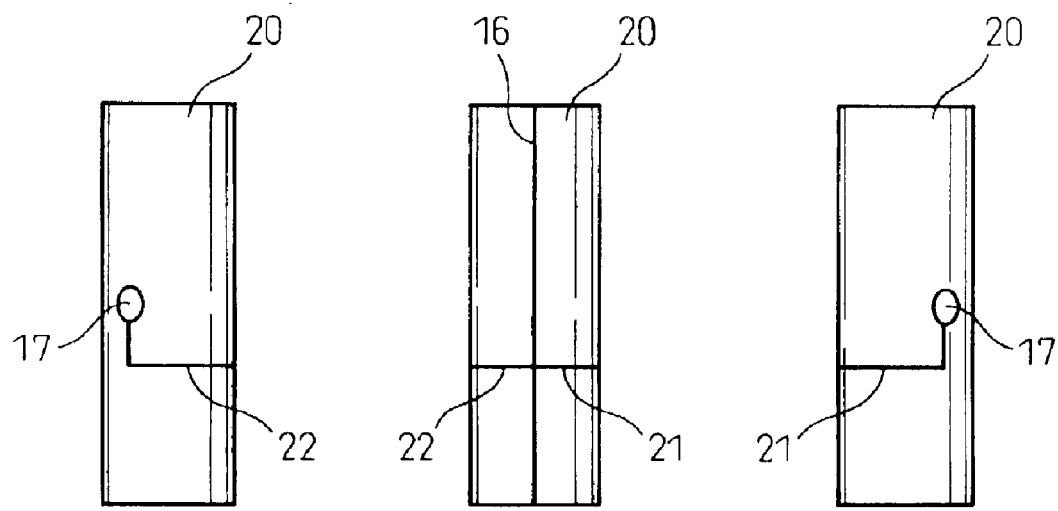
Figure 10:
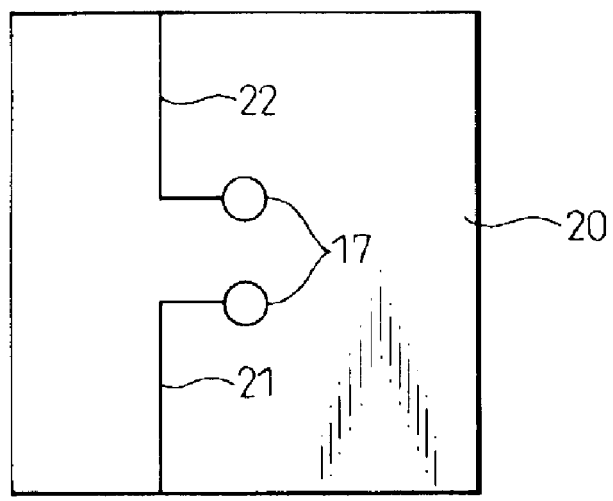
FIG. 10 is a schematic view (No. 2) showing the connection cord fitting member according to the second embodiment of the present invention.

FIG. 9 is a schematic view (No. 1) showing a connection cord fitting member according to the second embodiment of the present invention. In this drawing, portion (a) shows a plan view, portion (b) shows a front view, portion (c) shows a left-hand side view and portion (d) shows a right-hand side view. FIG. 10 is a schematic view (No. 2) showing the connection cord fitting member according to the second embodiment of the present invention and FIG. 10 shows a development.

Figure 11:
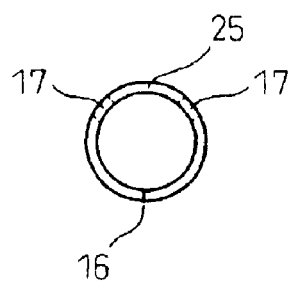
FIG. 11, including
Figure 11:
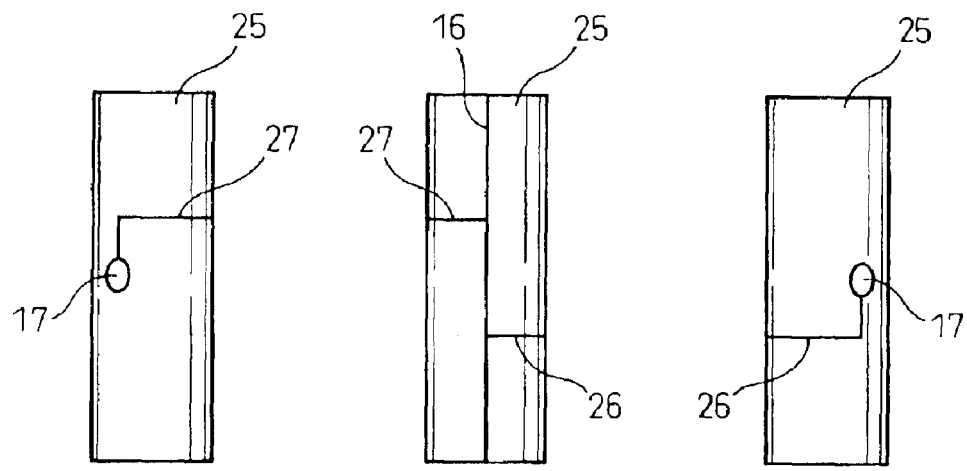
Figure 12:
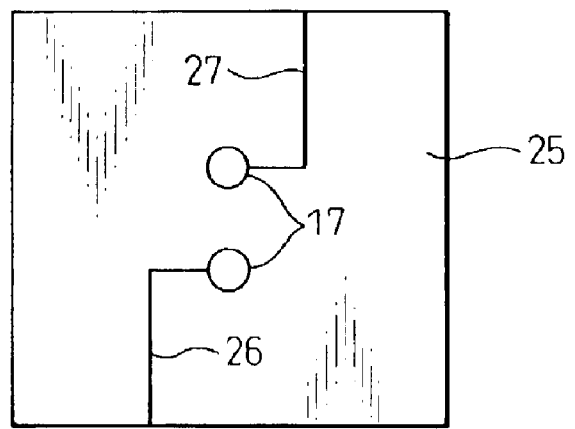
FIG. 12 is a schematic view (No. 2) showing a connection cord fitting member which is partly different from the second embodiment of the present invention.

FIG. 11 is a schematic view (No. 1) showing a connection cord fitting member which is partly different from the second embodiment of the present invention. In this drawing, portion (a) shows a plan view, portion (b) shows a front view, portion (c) shows a left-hand side view, and portion (d) shows a right-hand side view. FIG. 12 is a schematic view (No. 2) showing the connection cord fitting member which is partly different from the second embodiment of the present invention and FIG. 12 shows a development.

Figure 13:
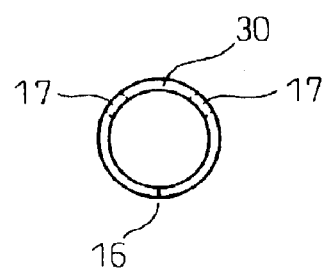
FIG. 13, including
Figure 13:
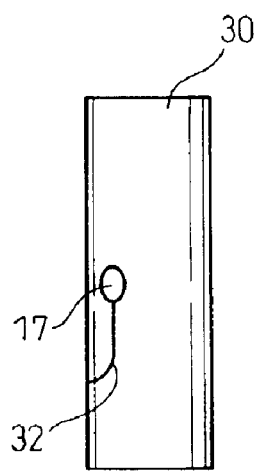
Figure 13:
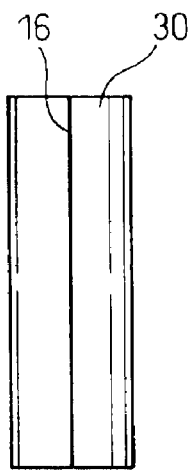
Figure 13:
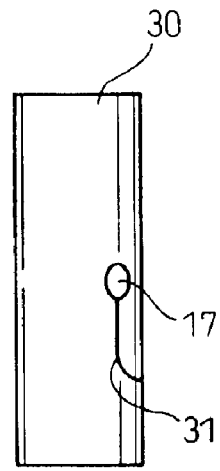
Figure 14:
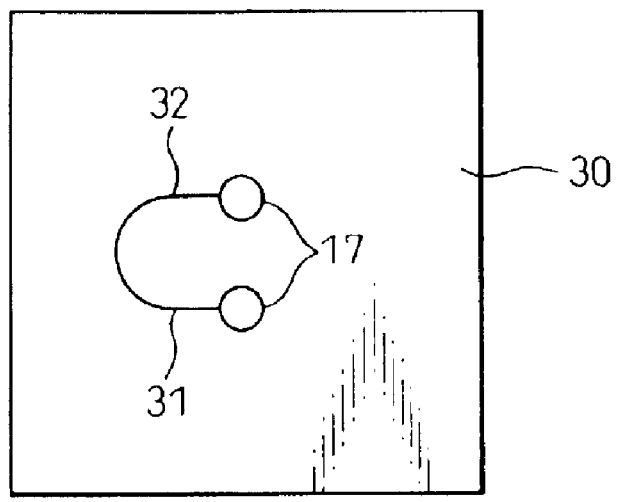
FIG. 14 is a schematic view (No. 2) showing another connection cord fitting member which is partly different from the second embodiment of the present invention.

FIG. 13 is a schematic view (No. 1) showing a connection cord fitting member which is partly different from the second embodiment of the present invention. In this drawing, portion (a) shows a plan view, portion (b) shows a front view, portion (c) shows a left-hand side view, and portion (d) shows a right-hand side view. FIG. 14 is a schematic view (No. 2) showing the connection cord fitting member which is partly different from the second embodiment of the present invention and FIG. 14 shows a development.

Because the second embodiment is a modification of a part of the first embodiment and is substantially the same as the first embodiment in the remaining parts, the same reference numerals will be used to identify the same constituent elements as explained above, and an explanation will be given mainly on the modified part with an explanation concerning the remaining parts being omitted.

Referring to FIGS. 9 and 10, reference numeral 20 denotes a connection cord fitting member. This connection cord fitting member 20 is different from the connection cord fitting member 15 of the first embodiment in the portion of the cut portions (edge-cut portions) connecting the cord retention holes 17 and the end face of the opening part 16 with the remaining portions being substantially the same. As shown in FIG. 9, L-shaped cut portions 21 and 22 (that are symmetric with respect to a centerline extending in the axial direction of the cylinder) are formed on the connection cord fitting member 20. Each L-shaped cut portion 21, 22 first extends by a predetermined length from the side surface of each cord retention hole 17 towards the end face direction of the cylinder (in the same direction on either the right or the left in the drawing) and then extends in each end face direction of the opening part 16.

Referring to FIGS. 11 and 12, reference numeral 25 denotes a connection cord fitting member. This connection cord fitting member 20 is different from the connection cord fitting member 15 of the second embodiment shown in FIGS. 9 and 10 in the portions of the cut portions 21 and 22 (edge-cut portions) connecting the cord retention holes 17 and the end face of the opening part 16 with the remaining portions being substantially the same. As shown in FIGS. 11 and 12, L-shaped cut portions 26 and 27 (that are symmetric with respect to the centerline passing through the two cord retention holes 17) are formed on the connection cord fitting member 20. Each of the L-shaped cut portions 26, 27 first extends by a predetermined length from the side surface of each cord retention hole 17 towards the end face direction of the cylinder (in the right or left direction in the drawing) and then extends in each end face direction of the opening part 16.

Referring to FIGS. 13 and 14, reference numeral 30 denotes a connection cord fitting member. This connection cord fitting member 30 is different from the connection cord fitting member 20 of the second embodiment shown in FIGS. 9 and 10 in the portions of the cut portions 21 and 22 (edge-cut portions) connecting the cord retention holes 17 and the end face of the opening portion 16 with the remaining portions being substantially the same. As shown in FIGS. 13 and 14, U-shaped cut portions 31 and 32 are formed on the connection cord fitting member 20. Each of the U-shaped cut portions 31, 32 first extends by a predetermined length from the side surface of each cord retention hole 17 towards the end face direction of the cylinder (in the same direction to the right or left direction in the drawing) and then its distal end portion is connected to that of the other through a curve.

As explained above, all of the connection cord fitting members 20, 25 and 30 according to the second embodiment can obtain the same effect as the first embodiment of the present invention.

In addition, each of the connection cord fitting members 20, 25 and 30 provides the following peculiar effect.

In the connection cord fitting member 20, the cut portions 21 and 22 through which the connection cord 13 passes extend from the respective cord retention holes 17 in the axial direction of the cylinder and are then bent into the L shape. Therefore, even when a force acts on the connection cord fitting member 20 in its fall-off direction after the connection cord fitting member 20 is fitted to the door weather strip 10 while holding the connection cord 13, the connection cord fitting member 20 does not easily fall off because the connection cord 13 pushes the connection cord fitting member 20 to the door weather strip 10.

In the connection cord fitting member 25, the cut portions 26 and 27 through which the connection cord 13 passes extend from the respective cord retention holes 17 in the axial direction of the cylinder and are then bent into the L shape. Moreover, the cut portions 26 and 27 are arranged so as to be symmetric with each other with respect to the centerline passing through the two cord retention holes 17. Therefore, a balance can be secured between the right side and the left side while interposing the opening part 16 between them, and the clamp force to the door weather strip 10 becomes stabilized when the connection cord fitting member 25 is fitted to the door weather strip 10. After the connection cord fitting member 25 holds the connection cord 13 and is fitted to the door weather strip 10 in the same way as the connection cord fitting member 20, the connection cord fitting member 25 does not easily fall off even when a force acts on the connection cord fitting member 25 in its fall-off direction because the connection cord 13 pushes the connection cord fitting member 25 to the door weather strip 10.

In the connection cord fitting member 30, the U-shaped cut portion 31 through which the connection cord 13 passes is formed on the opposing surface of the opening part 16, and any cut portion that connects the end face of the opening part 16 to the cord retention hole 17 does not exist. Therefore, the clamp force to the door weather strip 10 increases. Even when the force acts on the connection cord fitting member 30 fitted to the door weather strip 10 in the fall-off direction, the connection cord fitting member 30 does not fall off because the cut portion through which the connection cord 13 passes in the direction of the opening portion 16 does not exist and because the connection cord 13 pushes the connection cord fitting member 30 to the door weather strip 10. In addition, because the U-shaped cut portions 31 and 32 through which the connection cord 13 passes are formed on the opposing surfaces of the opening portion 16, it becomes possible to pass the connection cord 13 from the U-shaped cut portions 31 and 32 and to insert it into the cord retention holes 17 after the connection cord fitting member 30 is fitted to the door weather strip 10.

Further, a third embodiment of the present invention will be explained with reference to FIGS. 15 and 16.

Figure 15:
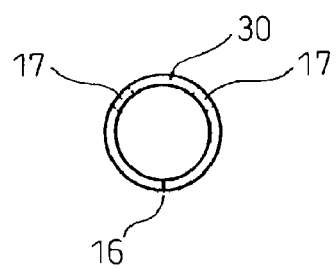
FIG. 15, including
Figure 15:
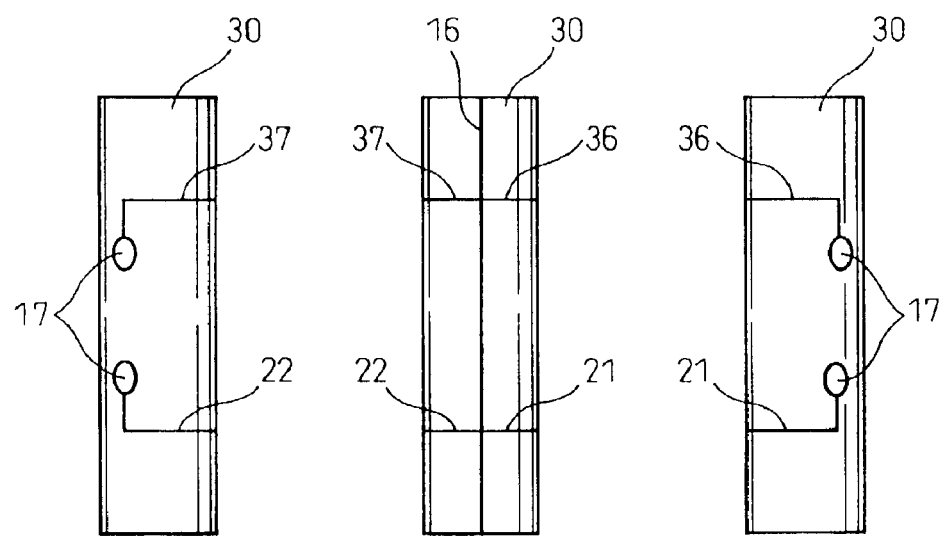
Figure 16:
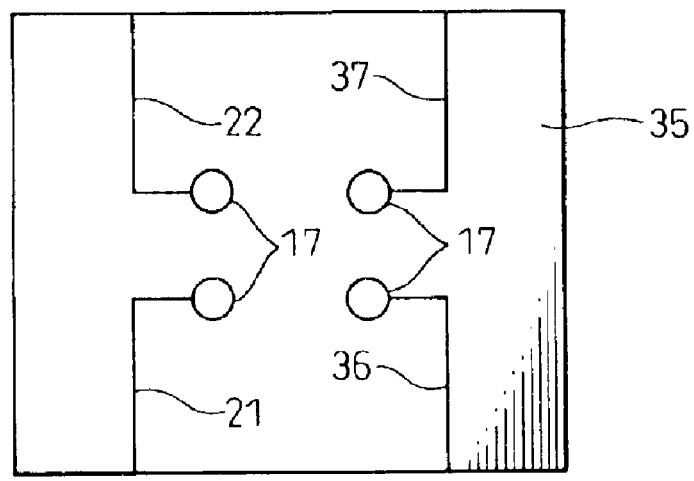
FIG. 16 is a schematic view (No. 2) showing the connection cord fitting member according to the third embodiment of the present invention.

FIG. 15 is a schematic view (No. 1) showing a connection cord fitting member according to the third embodiment of the present invention. In this drawing, portion (a) shows a plan view, portion (b) shows a front view, portion (c) shows a left-hand side view, and portion (d) shows a right-hand side view. FIG. 16 is a schematic view (No. 2) showing the connection cord fitting member according to the third embodiment of the present invention and FIG. 16 shows a development.

In the third embodiment, the same reference numerals will be used to identify the same constituent elements as in the first and second embodiments, and an explanation will be given mainly on the modified part with an explanation concerning the remaining part being omitted.

Reference numeral 35 denotes a connection cord fitting member. This connection cord fitting member 35 is different from the connection cord fitting members 15, 20, 25 and 30 of the first and second embodiments in that two sets of cord retention holes 17 for supporting a plurality of connection cords 13 (two cords in this embodiment) are formed as shown in FIGS. 15 and 16, with the remaining part being substantially the same as the first and second embodiments.

The connection cord fitting member 35 includes sets of the cord retention holes 17 and the cut portions 36 and 37 that are symmetric with each other with respect to the centerline extending in the direction crossing the cylinder, and have the pattern comprising the cord retention holes 17 and the cut portions 21 and 22 formed on the connection cord fitting member 20 of the second embodiment.

According to the connection cord fitting member 35 of the third embodiment explained above, one connection cord fitting member 35 can retain a plurality of connection cords. Therefore, the fitting to the door weather strip 10 can be easily carried out, an appearance after the fitting is excellent, and wastes in a material cost, a processing cost, a molding cost and a management cost can be saved, lowering thereby the overall production cost. This embodiment can provide the same effect as that of the first embodiment of the present invention.

In this embodiment, the patterns of the connection cord fitting member 20 of the second embodiment are disposed symmetrically with respect to the centerline extending in the direction crossing the cylinder. However, the patterns may also be arranged in parallel. Further, the patterns of the fitting member of the first, second and other embodiments may also be arranged symmetrically or in parallel with each other in the same way as in this embodiment. The patterns of the connection cord fitting members of the first and second embodiments may further be combined with each other.

Further, a fourth embodiment of the present invention will be explained with reference to FIGS. 17 to 20.

Figure 17:
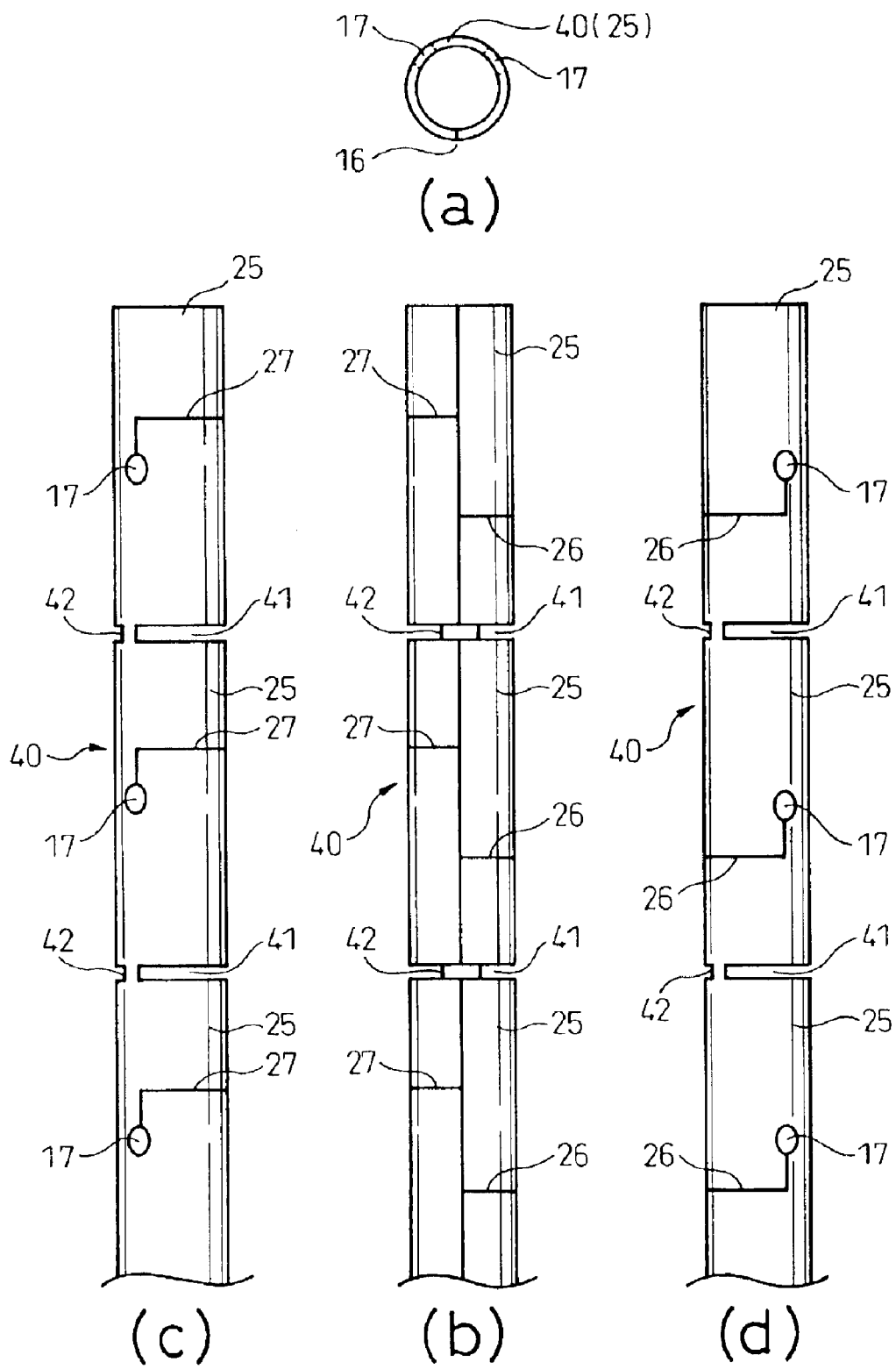
FIG. 17, including
Figure 18:
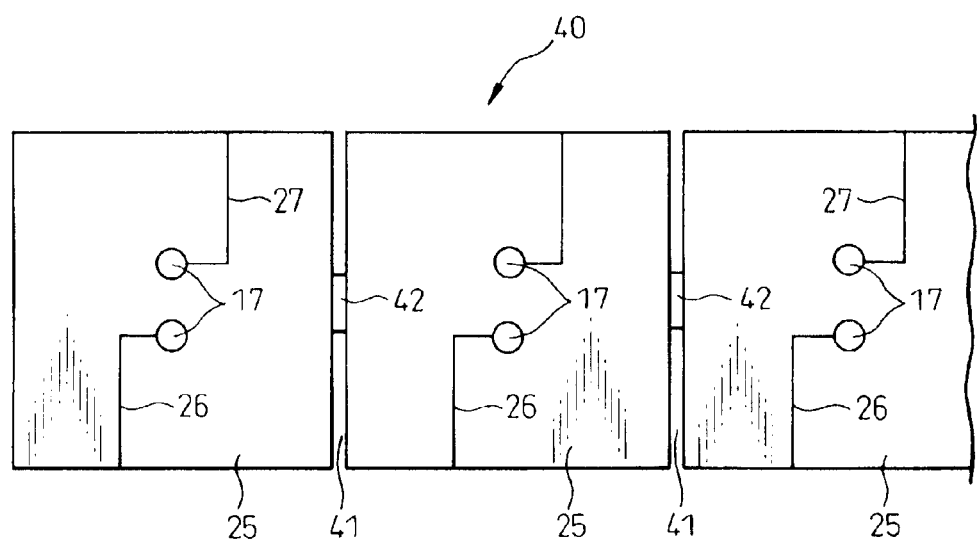
FIG. 18 is a schematic view (No. 2) showing the connection cord fitting member according to the fourth embodiment of the present invention.

FIG. 17 is a schematic view (No. 1) showing a connection cord fitting member according to the fourth embodiment of the present invention. In this drawing, portion (a) shows a plan view, portion (b) shows a front view, portion (c) shows a left-hand side view, and portion (d) shows a right-hand side view. FIG. 18 is a schematic view (No. 2) showing the connection cord fitting member according to the fourth embodiment of the present invention and FIG. 18 shows a development.

Figure 19:
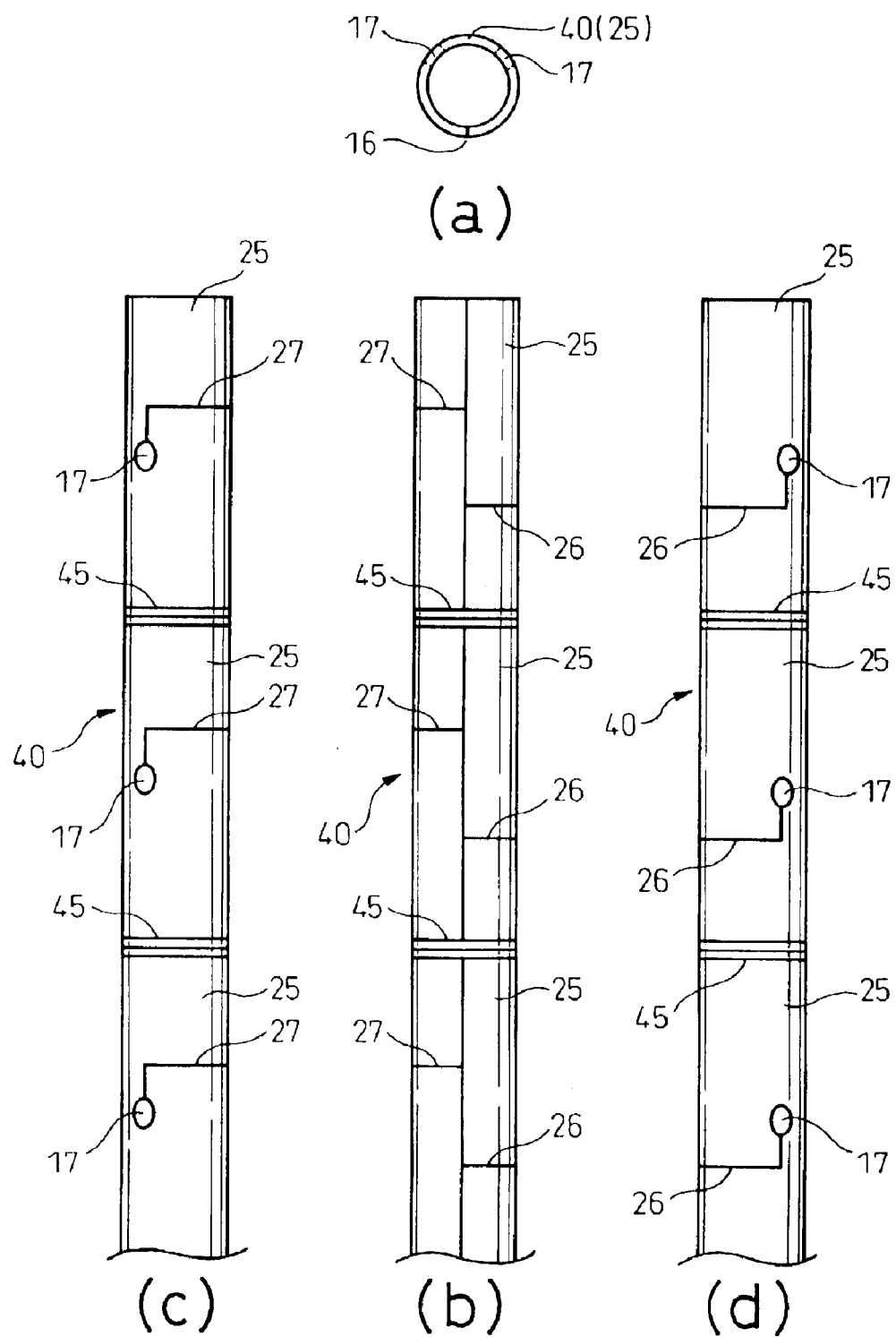
FIG. 19, including

FIG. 19 is a schematic view (No. 1) showing a connection portions each different from the connection cord fitting member of the fourth embodiment of the present invention. In this drawing, portion (a) shows a plan view, portion (b) shows a front view, portion (c) shows a left-hand side view, and portion (d) shows a right-hand side view. FIG. 20 is a schematic view (No. 2) showing the connection portions different from the connection cord fitting member according to the fourth embodiment of the present invention. In this drawing, portion (a) shows a development and portion (b) shows an enlarged sectional view of B—B portion.

In the fourth embodiment, the same reference numerals will be used to identify the same constituent elements as in the first to third embodiments, and explanation will be given mainly on the modified part with an explanation concerning the remaining part being omitted.

Reference numeral 40 denotes a connection cord fitting member. The connection cord fitting member 40 is formed by connecting necessary ones of the connection cord fitting members (or connection cord fitting units) of the first, second and third embodiments, that is, a plurality of connection cord fitting members 25 of the second embodiment, for example, as shown in FIGS. 18 and 19. Incidentally, the connection portion is suitably adjusted by a length of a slit 41 formed on the end face of each opening part 16 and a depth of a groove portion 42 so that the connection portion can be split without using a cutting tool, such as a pair of scissors.

According to the connection cord fitting member 40 of the fourth embodiment explained above, a plurality of connection cord fitting members are interconnected with each other. Therefore, wastes in a material cost, a processing cost, a molding cost and a management cost can be saved, lowering thereby the overall production cost. In addition, this embodiment can provide the same effect as that of the first embodiment of the present invention.

In the fourth embodiment shown in FIGS. 17 and 18, the splitting means comprising the slit 41 and the groove portion 42 are provided so that the connection portions can be easily split. However, it is also possible to employ a construction in which the thickness of the connection portion is reduced as much as possible, and a V-shaped groove portion 45 (corresponding to splitting means) is formed as shown in FIGS. 19 and 20 so that the connection portion can be split by hand.

In each of the first to fourth embodiments of the present invention, the connection cord fitting member has the cylindrical sectional shape, but the shape is not limited to the cylindrical shape. When the connection cord fitting member is fitted to a door weather strip having any sectional shape other than the cylindrical shape, the shape of an inner diametric portion of the connection cord fitting member may be brought into conformity with the sectional shape of the counter-part member. The connection cord fitting member can also be applied to any member other than the door weather strip (e.g., member having a cylindrical or prismatic shape and any other member than flexible member). In the first to fourth embodiments of the present invention, the fixing member is the connection cord fitting member, but the fixing member can be applied to the fitting of any other members than the connection cord.

On the other hand, the cord retention hole 17 is the round hole. However, the cord retention hole 17 is not particularly limited to the round hole but may well have other shapes so long as it can reliably retain the counter part member. Though one cord retention hole 17 retains one connection cord 13 in the embodiments, one cord retention hole may well retain a plurality of connection cords.

When a part or an entire part of the inner surface of the connection cord fitting member is a pear-like surface (that is, a coarse surface) or a surface having concavo-convexity, the contact resistance with the door weather strip (or other counter-part member) can be increased. When concavo-convexity having a triangular shape (alligator-mouth shape) is provided to the open surface opposing the opening part 16, the clamp force to the door weather strip (or other counter-part member) can be increased and the fixing force can be enhanced.

On the other hand, when a double-faced adhesive tape is bonded to a predetermined position of the inner surface of the connection cord fitting member depending on the shape of the counter-part member, its material and its fitting condition, the fixing force to the counter-part member can be reinforced.

In the first to third embodiments of the present invention, the connection cord fitting member is produced in a unit. However, it is also possible to continuously form a plurality of connection cord fitting members in a unit and to cut the connection cord fitting member with a cutting tool, such as a pair of scissors, whenever necessary. It becomes thus possible to save wastes in material cost, machining cost, molding cost and management cost, and to eventually reduce the production cost.

When the fixing member of each of the first to fourth embodiments is used, it is possible to provide a cord fixing structure according to the present invention wherein the cord retention hole, the cut portion for inserting the connection cord into the cord retention hole and the clamp portion for clamping the door weather strip by means of resiliency are integratedly formed.

When the fixing member of each of the first to fourth embodiments is used, it is possible to provide a cord fixing structure according to the present invention wherein the cord retention hole, the cutout portion having a width for inserting the connection cord into the cord retention hole and the clamp portion for clamping the door weather strip by means of resiliency are integratedly formed.

When the fixing member of each of the first to fourth embodiments is used, it is possible to provide a cord fixing structure according to the present invention wherein the cutout portion having a taper part for inserting the connection cord and the clamp portion for clamping the counter-part member by means of resiliency are integratedly formed.

In the cord fixing structure described above, the fixing member of the embodiments of the present invention fixes the connection cord for connecting a plurality of apparatuses with each other, or the connection cord taken out from one apparatus.

On the other hand, when the fixing member of each of the first to fourth embodiments is used, it is possible to provide a vehicle-mounted apparatus according to the present invention wherein the cord retention hole, the cut portion for inserting the connection cord into the cord retention hole and the clamp portion for clamping the door weather strip by means of resiliency are integratedly formed.

Alternatively, when the fixing member of each of the first to fourth embodiments is used, it is possible to provide a vehicle-mounted apparatus according to the present invention wherein the cord retention hole, the cutout portion having a width for inserting the connection cord into the cord retention hole and the clamp portion for clamping the door weather strip by means of resiliency are integratedly formed.

Alternatively, when the fixing member of each of the first to fourth embodiments is used, it is possible to provide a vehicle-mounted apparatus according to the present invention wherein the cutout portion having a taper part for inserting the connection cord and the clamp portion for clamping the counter-part member by means of resiliency are integratedly formed.

On the other hand, when the fixing member of each of the first to fourth embodiments is used, it is possible to provide a vehicle according to the invention wherein the cord retention hole, the cut portion for inserting the connection cord into the cord retention hole and the clamp portion for clamping the door weather strip by means of resiliency are integratedly formed.

Alternatively, when the fixing member of each of the first to fourth embodiments is used, it is possible to provide a vehicle according to the present invention wherein the cord retention hole, the cutout portion having a width for inserting the connection cord into the cord retention hole and the clamp portion for clamping the door weather strip by means of resiliency are integratedly formed.

Alternatively, when the fixing member of each of the first to fourth embodiments is used, it is possible to provide a vehicle according to the present invention wherein the cutout portion having the taper part for inserting the connection cord and the clamp portion for clamping the counter-part member by means of resiliency are integratedly formed.

As explained above, the preferred embodiments of the present invention can economically provide the fixing member (connection cord fitting member) that can be easily fitted to and removed from the counter-part member, such as the connection cord, and can reliably retain the fixed member, such as the connection cord, the cord fixing structure, the vehicle-mounted apparatus, the vehicle, and the method of fabricating the fixing member.

What is claimed is:

1. A fixing member, which is to be fixed to a counter-part member, for retaining a fixed member, comprising:
    a retention hole portion for retaining said fixed member; and
    a cut portion for inserting said fixed member into said retention hole portion,
    wherein said fixing member is adapted to clamp said counter-part member by means of resiliency.

2. A fixing member, which is to be fixed to a counter-part member, for retaining a fixed member, comprising:
    a retention hole portion for retaining said fixed member; and
    a cutout portion having a width for inserting said fixed member into said retention hole portion
    wherein said fixing member is adapted to clamp said counter-part member by means of resiliency.

3. A fixing member, which is to be fixed to a counter-part member, for retaining a fixed member, comprising a cutout portion having a taper part into which said fixed member can be inserted;
    wherein said fixing member is adapted to clamp said counter-part member by means of resiliency.

4. A fixing member according to claim 1, further comprising a cylindrical body part formed by an elastic member into a cylindrical shape and an opening part formed so as to extend in a direction of an axis of said cylindrical body part, and at least two retention holes functioning as said retention hole portion are formed in said cylindrical body part in a direction crossing said axis.

5. A fixing member according to claim 2, further comprising a cylindrical body part formed by an elastic member into a cylindrical shape and an opening part formed so as to extend in an axial direction of said cylindrical body part, and at least two retention holes functioning as said retention hole portion are formed in said cylindrical body part in a direction crossing said axis.

6. A fixing member according to claim 3, further comprising a cylindrical body part formed by an elastic member into a cylindrical shape, and an opening part formed so as to extend in an axial direction of said cylindrical body part.

7. A fixing member according to claim 4, wherein said cut portion is formed in such a manner as to extend from one side of the cylinder end surfaces of each of said retention holes in a direction of one cylinder end surface and then to connect to each end face of said opening part.

8. A fixing member according to claim 4, wherein said cut portion is formed in such a manner that one of said two retention holes extends from one side of the cylinder end surfaces in a direction of one cylinder end surface and then connects to one end face of said opening part, and the remaining one of said two retention holes extends from the other side of the cylinder end surfaces of the remaining one of said retention holes in a direction of the other cylinder end surface and then connects to the other end face of said opening part.

9. A fixing member according to claim 4, wherein said cut portion is formed in such a manner as to extend from one side of the cylinder end surfaces of each of said retention holes in a direction of one cylinder end surface, and the extending distal end portions in said cut portion are connected to each other.

10. A fixing member according to claim 5, wherein said cutout portion is formed in such a manner as to extend from one side of the cylinder end surfaces sides of each of said retention holes in a direction of one cylinder end surface, and then to connect to each end face of said opening part.

11. A fixing member according to claim 5, wherein said cutout portion is formed in such a manner that one of said two retention holes extends from one side of the cylinder end surfaces in a direction of one cylinder end surface and then connects to one end face of said opening part, and the remaining one of said two retention holes extends from the other side of the cylinder end surfaces of the remaining one of said retention holes in a direction of the other cylinder end surface and then connects to the other end face of said opening part.

12. A fixing member according to claim 5, wherein said cutout portion is formed in such a manner as to extend from one side of the cylinder end surfaces of each of said retention holes in a direction of one cylinder end surface, and the extending distal end portions in said cutout portion are connected to each other.

13. A fixing member according to claim 6, wherein said cutout portion is formed so that one side of said cutout portion extends in a direction of one cylinder end surface and then connects to each end face of said opening part.

14. A fixing member according to claim 6, wherein one of said cutout portion is formed so that one side of said cutout portion extends in a direction of one cylinder end surface and then connects to one end face of said opening part, and the other side of said cutout portion extends in a direction of the other cylinder end surface and then connects to the other end face of said opening part.

15. A fixing member according to claim 6, wherein said cutout portion is formed in such a manner as to extend in a direction of one cylinder end surface, and the extending distal end portions in said cutout portion are connected to each other.

16. A fixing member according to claim 1, wherein said fixing member has a plurality of sets of said retention holes functioning as said retention hole portion, and each of said plurality of sets of said retention holes are provided with said cut portions.

17. A fixing member according to claim 4, wherein said fixing member has said plurality of sets of said retention holes, and each of said plurality of sets of said retention holes are provided with said cut portions.

18. A fixing member according to claim 2, wherein said fixing member has a plurality of sets of retention holes functioning said retention hole portion, and each of said plurality of sets of said retention holes are provided with said cutout portions.

19. A fixing member according to claim 5, wherein said fixing member has said plurality of sets of retention holes, and each of said plurality of sets of said retention holes are provided with said cutout portions.

20. A fixing member according to claim 3, wherein said fixing member has a plurality of sets of cutout portions.

21. A fixing member according to claim 6, wherein said fixing member has a plurality of sets of cutout portions.

22. A fixing member according to claim 16, wherein splitting means is provided between adjacent ones of said plurality of sets of retention holes to allow the splitting between said plurality of sets of retention holes to be easily carried out.

23. A fixing member according to claim 17, wherein splitting means is provided between adjacent ones of said plurality of sets of retention holes to allow the splitting between said plurality of sets of retention holes to be easily carried out.

24. A fixing member according to claim 18, wherein splitting means is provided between adjacent ones of said plurality of sets of retention holes to allow the splitting between said plurality of sets of retention holes to be easily carried out.

25. A fixing member according to claim 19, wherein splitting means is provided between adjacent ones of said plurality of sets of retention holes to allow the splitting between said plurality of sets of retention holes to be easily carried out.

26. A fixing member according to claim 20, wherein splitting means is provided between adjacent ones of said plurality of sets of cutout portions to allow the splitting between said plurality of sets of cutout portions to be easily carried out.

27. A fixing member according to claim 21, wherein splitting means is provided between adjacent ones of said plurality of sets of cutout portions to allow the splitting between said plurality of sets of cutout portions to be easily carried out.

28. A fixing member according to claim 4, wherein concavo-convexity is provided in an inner surface of said cylindrical body part.

29. A fixing member according to claim 4, wherein concavo-convexity is provided in each end face of said opening part.

30. A fixing member according to claim 4, wherein adhesive means is provided in an inner surface of said cylindrical body part.

31. A fixing member according to claim 1, wherein said fixed member is a cord.

32. A fixing member according to claim 4, wherein said fixed member is a cord.

33. A fixing member according to claim 1, wherein said counter-part member is a weather strip in a car door.

34. A fixing member according to claim 4, wherein said counter-part member is a weather strip in a car door.

35. A fixing member according to claim 5, wherein concavo-convexity is provided in an inner surface of said cylindrical body part.

36. A fixing member according to claim 5, wherein concavo-convexity is provided in each end face of said opening part.

37. A fixing member according to claim 5, wherein adhesive means is provided in an inner surface of said cylindrical body part.

38. A fixing member according to claim 2, wherein said fixed member is a cord.

39. A fixing member according to claim 5, wherein said fixed member is a cord.

40. A fixing member according to claim 2, wherein said counter-part member is a weather strip in a car door.

41. A fixing member according to claim 5, wherein said counter-part member is a weather strip in a car door.

42. A fixing member according to claim 6, wherein concavo-convexity is provided in an inner surface of said cylindrical body part.

43. A fixing member according to claim 6, wherein concavo-convexity is provided in each end face of said opening part.

44. A fixing member according to claim 6, wherein adhesive means is provided in an inner surface of said cylindrical body part.

45. A fixing member according to claim 3, wherein said fixed member is a cord.

46. A fixing member according to claim 6, wherein said fixed member is a cord.

47. A fixing member according to claim 3, wherein said counter-part member is a weather strip in a car door.

48. A fixing member according to claim 6, wherein said counter-part member is a weather strip in a car door.

49. A cord fixing structure comprising:
   a plurality of apparatuses;
   a cord for connecting said plurality of apparatuses; and
   a fixing member, which is to be fixed to a counter-part member, for fixing said cord,
   wherein said fixing member includes:
   a retention hole portion for retaining said cord; and
   a cut portion for inserting said cord into said retention hole portion,
   wherein said fixing member is adapted to clamp said counter-part member by means of resiliency.

50. A cord fixing structure comprising:
a plurality of apparatuses;
a cord for connecting said plurality of apparatuses; and
a fixing member, which is to be fixed to a counter-part member, for fixing said cord;
wherein said fixing member includes:
a retention hole portion for retaining said cord; and
a cutout portion having a width for inserting said cord into said retention hole portion,
wherein said fixing member is adapted to clamp said counter-part member by means of resiliency.

51. A cord fixing structure comprising:
a plurality of apparatuses;
a cord for connecting said plurality of apparatuses; and
a fixing member, which is to be fixed to a counter-part member, for fixing said cord,
wherein said fixing member includes a cutout portion having a taper part into which said cord can be inserted,
wherein said fixing member is adapted to clamp said counter-part member by means of resiliency.

52. A cord fixing structure according to claim 49, wherein said counter-part member is a weather strip in a car door.

53. A cord fixing structure according to claim 50, wherein said counter-part member is a weather strip in a car door.

54. A cord fixing structure according to claim 51, wherein said counter-part member is a weather strip in a car door.

55. A cord fixing structure comprising:
one apparatus;
a cord taken out from said one apparatus; and
a fixing member, which is to be fixed to a counter-part member, for retaining said cord;
wherein said fixing member includes:
a retention hole portion for retaining said cord; and
a cut portion for inserting said cord into said retention hole portion,
wherein said fixing member is adapted to clamps said counter-part member by means of resiliency.

56. A cord fixing structure comprising:
one apparatus;
a cord taken out from said one apparatus; and
a fixing member, which is to be fixed to a counter-part member, for retaining said cord;
wherein said fixing member includes:
a retention hole portion for retaining said cord; and
a cutout portion having a width for inserting said cord into said retention hole portion,
wherein said fixing member is adapted to clamp said counter-part member by means of resiliency.

57. A cord fixing structure comprising:
one apparatus;
a cord taken out from said one apparatus; and
a fixing member, which is to be fixed to a counter-part member, for retaining said cord;
wherein said fixing member includes a cutout portion having a taper part into which said cord can be inserted,
wherein said fixing member is adapted to clamp said counter-part member by means of resiliency.

58. A cord fixing structure according to claim 55, wherein said counter-part member is a weather strip in a car door.

59. A cord fixing structure according to claim 56, wherein said counter-part member is a weather strip in a car door.

60. A cord fixing structure according to claim 57, wherein said counter-part member is a weather strip in a car door.

61. A vehicle-mounted apparatus comprising:
a first apparatus fitted outside a car;
a second apparatus fitted inside said car;
a cord for connecting said first apparatus to said second apparatus; and
a fixing member, which is to be fixed to a part of said car, for retaining said cord;
wherein said fixing member includes:
a retention hole portion for retaining said cord; and
a cut portion for inserting said cord into said retention hole portion,
wherein said fixing member is adapted to clamp said counter-part member by means of resiliency.

62. A vehicle-mounted apparatus comprising:
a first apparatus fitted outside a car;
a second apparatus fitted inside said car;
a cord for connecting said first apparatus to said second apparatus; and
a fixing member, which is to be fixed to a part of said car, for retaining said cord;
wherein said fixing member includes:
a retention hole portion for retaining said cord; and
a cutout portion having a width for inserting said cord into said retention hole portion,
wherein said fixing member is adapted to clamp said counter-part member by means of resiliency.

63. A vehicle-mounted apparatus comprising:
a first apparatus fitted outside a car;
a second apparatus fitted inside said car;
a cord for connecting said first apparatus to said second apparatus; and
a fixing member, which is to be fixed to a part of said car, for retaining said cord;
wherein said fixing member includes a cutout portion having a taper part into which said cord can be inserted,
wherein said fixing member is adapted to clamp said counter-part member by means of resiliency.

64. A vehicle-mounted apparatus according to claim 61, wherein said first apparatus is an antenna.

65. A vehicle-mounted apparatus according to claim 62, wherein said first apparatus is an antenna.

66. A vehicle-mounted apparatus according to claim 63, wherein said first apparatus is an antenna.

67. A vehicle-mounted apparatus according to claim 61, wherein said part of said car is a weather strip in a car door.

68. A vehicle-mounted apparatus according to claim 62, wherein said part of said car is a weather strip in a car door.

69. A vehicle-mounted apparatus according to claim 63, wherein said part of said car is a weather strip in a car door.

70. A vehicle comprising:
a first apparatus fitted outside a car;
a second apparatus fitted inside said car;
a cord for connecting said first apparatus to said second apparatus; and
a fixing member, which is to be fixed to a part of said car, for retaining said cord;
wherein said fixing member includes:
a retention hole portion for retaining said cord; and
a cut portion for inserting said cord,
wherein said fixing member is adapted to clamp said counter-part member by means of resiliency.

71. A vehicle comprising:
a first apparatus fitted outside a car;
a second apparatus fitted inside said car;
a cord for connecting said first apparatus to said second apparatus; and a fixing member, which is to be fixed to a part of said car, for retaining said cord;

wherein said fixing member includes:

a retention hole portion for retaining said cord; and a cutout portion having a width for inserting said cord into said retaining hole portion, wherein said fixing member is adapted to clamp said counter-part member by means of resiliency.

72. A vehicle comprising a first apparatus fitted outside a car;

a second apparatus fitted inside said car;

a cord for connecting said first apparatus to said second apparatus; and a fixing member, which is to be fixed to a part of said car, for retaining said cord;

wherein said fixing member includes a cutout portion having a taper part into which said cord can be inserted, wherein said fixing member is adapted to clamp said counter-part member by means of resiliency.

73. A vehicle according to claim 70, wherein said first apparatus is an antenna.

74. A vehicle according to claim 71, wherein said first apparatus is an antenna.

75. A vehicle according to claim 72, wherein said first apparatus is an antenna.

76. A vehicle according to claim 70, wherein said part of said car is a weather strip in a door.

77. A vehicle according to claim 71, wherein said part of said car is a weather strip in a door.

78. A vehicle according to claim 72, wherein said part of said car is a weather strip in a door.

79. A method of fabricating a fixing member, which is to be fixed to a counter-part member by clamping said counter-part member by means of resiliency, for retaining a fixed member, comprising:

forming integratedly with each other, a retention hole portion for retaining said fixed member, and a cut portion for inserting said fixed member into said retention hole portion.

80. A method of fabricating a fixing member, which is to be fixed to a counter-part member by clamping said counter-part member by means of resiliency, for retaining a fixed member, comprising:

forming integratedly with each other, a retention hole portion for retaining said fixed member, and a cutout portion having a width for inserting said fixed member into said retention hole portion.

81. A method of fabricating a fixing member, which is to be fixed to a counter-part member by clamping said counter-part member by means of resiliency, for retaining a fixed member, comprising:

forming a cutout portion having a taper part into which said fixed member can be inserted.

82. A method of fabricating a fixing member, which is to be fixed to a counter-part member by clamping said counter-part member by means of resiliency, for retaining a fixed member, comprising the step of:

forming said fixing member consisting of a plurality of fixing units connected in series with each other, each of said fixing units including a retention hole portion for retaining said fixed member, and a cut portion for inserting said fixed member into said retention hole portion, which are formed integrated with each other.

83. A method of fabricating a fixing member, which is to be fixed to a counter-part member by clamping said counter-part member by means of resiliency, for retaining a fixed member, comprising the step of:

forming said fixing consisting of a plurality of fixing units connected in series with each other, each of said fixing units including a retention hole portion for retaining said fixed member, and a cutout portion having a width for inserting said fixed member into said retention hole portion and a clamp portion, which are formed integratedly with each other.

84. A method of fabricating a fixing member, which is to be fixed to a counter-part member by clamp said counter-part member by means of resiliency, for retaining a fixed member, comprising the step of:

forming said fixing member consisting of a plurality of fixing units connected in series with each other, each of said fixing member including a cutout portion having a taper part into which said fixed member can be inserted.

85. A fixing member according to claim 1, wherein said cut portion and said retention hole portion are formed integratedly with each other.

86. A fixing member according to claim 2, wherein said cutout portion and said retention hole portion are formed integratedly with each other.

87. A cord fixing structure according to claim 55, wherein said cut portion and said retention hole portion are formed integratedly with each other.

88. A cord fixing structure according to claim 56, wherein said cutout portion and said retention hole portion are formed integratedly with each other.

89. A vehicle-mounted apparatus according to claim 61, wherein said cut portion and said retention hole portion are formed integratedly with each other.

90. A vehicle mounted apparatus according to claim 62, wherein said cutout portion and said retention hole portion are formed integratedly with each other.

91. A vehicle according to claim 70, wherein said cut portion and said retention hole portion are formed integratedly with each other.

92. A vehicle according to claim 71, wherein said cutout portion and said retention hole portion are formed integratedly with each other.

* * * * *

UNITED STATES PATENT AND TRADEMARK OFFICE
CERTIFICATE OF CORRECTION

PATENT NO. : 6,986,539 B2  
APPLICATION NO. : 10/421674  
DATED : January 17, 2006  
INVENTOR(S) : Morimura It is certified that error appears in the above-identified patent and that said Letters Patent is hereby corrected as shown below:

| | |
|---|---|
| Column 19, line 8, Claim 14 | Delete "one of" |
| Column 19, line 23, Claim 16 | Delete "are", Insert --is-- |
| Column 19, line 28, Claim 17 | Delete "are", Insert --is-- |
| Column 19, line 31, Claim 18 | After "functioning", Insert --as-- |
| Column 19, line 32, Claim 18 | Delete "are", Insert --is-- |
| Column 19, line 36, Claim 19 | Delete "are", Insert --is-- |
| Column 21, line 36, Claim 55 | Delete "clamps", Insert --clamp-- |
| Column 24, line 15, Claim 83 | After "said fixing", Insert --member-- |
| Column 24, line 23, Claim 84 | Delete "clamp", Insert --clamping-- |

Signed and Sealed this

Twentieth Day of February, 2007

JON W. DUDAS  
*Director of the United States Patent and Trademark Office*